(12) United States Patent
Ueki et al.

(10) Patent No.: US 9,698,397 B2
(45) Date of Patent: Jul. 4, 2017

(54) BATTERY

(75) Inventors: Tomoyoshi Ueki, Toyota (JP);
Harunari Shimamura, Nagoya (JP);
Yusuke Fukumoto, Moriguchi (JP)

(73) Assignee: Toyota Jidosha Kabushiki Kaisha,
Toyota-shi, Aichi (JP)

( * ) Notice: Subject to any disclaimer, the term of this patent is extended or adjusted under 35 U.S.C. 154(b) by 205 days.

(21) Appl. No.: 14/356,458

(22) PCT Filed: Nov. 10, 2011

(86) PCT No.: PCT/JP2011/075938
§ 371 (c)(1),
(2), (4) Date: Jan. 16, 2015

(87) PCT Pub. No.: WO2013/069134
PCT Pub. Date: May 16, 2013

(65) Prior Publication Data
US 2015/0221919 A1    Aug. 6, 2015

(51) Int. Cl.
| | | |
|---|---|---|
| *H01M 2/16* | (2006.01) |
| *H01M 2/18* | (2006.01) |
| *H01M 2/34* | (2006.01) |
| *H01M 10/04* | (2006.01) |
| *H01M 10/0587* | (2010.01) |

(52) U.S. Cl.
CPC .......... *H01M 2/1653* (2013.01); *H01M 2/18* (2013.01); *H01M 2/34* (2013.01); *H01M 10/0431* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 2005/0019665 A1* | 1/2005 | Adachi | ................ B01D 65/102 |
| | | | 429/254 |
| 2010/0203371 A1 | 8/2010 | Nagai et al. | |
| 2011/0217590 A1* | 9/2011 | Nakano | ................... H01M 2/18 |
| | | | 429/208 |
| 2013/0040182 A1 | 2/2013 | Daidoji | |

FOREIGN PATENT DOCUMENTS

| | | |
|---|---|---|
| CN | 1578806 | 2/2005 |
| JP | 6-150900 | 5/1994 |
| JP | 2003-242955 | 8/2003 |
| JP | 2004-95382 | 3/2004 |
| JP | 2004-307712 | 11/2004 |
| JP | 2005-190785 | 7/2005 |

(Continued)

*Primary Examiner* — Sarah A Slifka
(74) *Attorney, Agent, or Firm* — Finnegan, Henderson, Farabow, Garrett & Dunner, LLP

(57) ABSTRACT

A battery includes a flat wound electrode body formed by winding a positive electrode sheet and a negative electrode sheet with a separator interposed therebetween into a flat shape. The separator has an outer edge adjacent portion adjacent to either an outer edge of a positive electrode active material layer or an outer edge of a negative electrode active material layer. In a curve positioned portion disposed at least in a curved portion of the flat wound electrode body, the outer edge adjacent portion has a suppression portion for suppressing the occurrence or development of a crack.

12 Claims, 20 Drawing Sheets

(56) References Cited

FOREIGN PATENT DOCUMENTS

| | | |
|---|---|---|
| JP | 2006-278245 | 10/2006 |
| JP | 2009-26705 | 2/2009 |
| JP | 2010-86775 | 4/2010 |
| JP | 2010086775 A * | 4/2010 |
| JP | 2011-243403 | 12/2011 |
| WO | WO 2004/020511 A1 | 3/2004 |
| WO | WO 2011/096070 A1 | 8/2011 |

* cited by examiner

BATTERY

CROSS-REFERENCE TO RELATED APPLICATIONS

This application is a national phase application of International Application No. PCT/JP2011/075938, filed Nov. 10, 2011, the content of which is incorporated herein by reference.

TECHNICAL FIELD

The present invention relates to a battery provided with a flat wound electrode body including a positive electrode sheet and a negative electrode sheet which are wound together in a flat form.

BACKGROUND ART

In recent years, batteries capable of being charged and discharged are utilized in drive power sources of vehicles such as a hybrid vehicle and an electric vehicle and portable electronic devices such as notebook-sized personal computer and a video camcorder. One example of such batteries is a battery configured such that an electrode body (corresponding to a flat wound electrode body mentioned later) including a current collector (corresponding to an electrode sheet mentioned later) that is wound around a winding axis and formed in a flat oval or elliptic shape in cross section (for example a battery disclosed in Patent Document 1).

RELATED ART DOCUMENTS

Patent Documents

Patent Document 1: JP-A-2009-26705

SUMMARY OF INVENTION

Problems to be Solved by the Invention

However, in the battery disclosed in Patent Document 1, if a temperature in the battery rises due to for example excessive charge and thus a separator thermally shrinks in a winding circumferential direction, portions of this separator located at both ends in a major-axis direction of the oval shape in the cross section and positioned in a curved winding portion curved in a round form are strongly pulled in a longitudinal direction. Accordingly, a part of the separator in the curved winding portion may strongly touch or contact a corner of a positive active material layer (or a negative active material layer) adjacent to the separator in a radial inside (on an inner circumferential side). In the separator, a crack thus occurs and grows starting from the corner in a longitudinal direction. This may lead to a short circuit between the positive electrode sheet and the negative electrode sheet through the crack.

The present invention has been made to solve the above problems and has a purpose to provide a battery configured to prevent a short circuit from occurring between a positive electrode sheet and a negative electrode sheet even when the internal temperature of the battery increases.

Means of Solving the Problems

To achieve the above purpose, one aspect of the invention provides a battery provided with a flat wound electrode body including a positive electrode sheet having a positive active material layer and a negative electrode sheet having a negative active material layer, the positive electrode sheet and the negative electrode sheet being wound together with a separator in a flat shape, wherein the separator includes an edge adjacent portion close to any one of an edge of the positive active material layer and an edge of the negative active material layer, and the edge adjacent portion includes a suppression portion at least in a curve positioned portion placed in a curved portion of the flat wound electrode body to suppress occurrence of a crack or growth of a crack.

In the above battery, the suppression portion is provided in at least the curve positioned portion of the edge adjacent portion of the separator, the curve positioned portion being placed in the curved portion of the flat wound electrode body (hereinafter, also simply referred to as an electrode body). In this battery, therefore, even when an internal temperature of the battery increases in use and the separator thermally shrinks in the winding circumferential direction, it is possible to suppress a crack from occurring and growing (developing) in the edge adjacent portion provided with the suppression portion and thus prevent a short circuit from occurring between the positive electrode sheet and the negative electrode sheet through the crack.

It is to be noted that the term "edge adjacent portion" indicates a portion of the separator that comes close to, on a radial outside, an edge of the positive active material layer or an edge of the negative active material layer adjacent to the separator on a radial inside of the electrode body. The term "curved portion" indicates a portion of the electrode body, located at each end of the electrode body in a major-axis direction of the cross section, in which curved portion each of the positive electrode sheet, the negative electrode sheet, and the separator is formed in a round shape.

The "suppression portion" includes, for example, a portion having a different orientation state of polymer constituting the resin material (a direction of orientation and a degree of orientation) from other portions, and a portion reinforced by a resin tape attached to the resin material or by a resin layer formed on the resin material. The configuration and placement of this "suppression portion" may include a configuration that the suppression portion is formed in a curve positioned portion of the edge adjacent portion, e.g., that the suppression portion extends throughout the winding circumferential direction of the curve positioned portion. There is also a configuration that a plurality of suppression portions are arranged in a separated broken-line pattern throughout the winding circumferential direction (a configuration that the "suppression portion" and a "non-suppression portion" are alternately arranged throughout the winding circumferential direction when the curve positioned portion is seen in the winding circumferential direction). In addition, there are also a configuration that the suppression portions are formed over the entire edge adjacent portion, for example, a configuration that the suppression portions extend throughout the winding circumferential direction of the edge adjacent portion, and a configuration that a plurality of suppression portions are arranged in a separated broken-line pattern throughout the winding circumferential direction.

The "flat wound electrode body" may include an electrode body configured so that a lead (a tab) member is extended from an electrode sheet (a positive electrode sheet or a negative electrode sheet) forming this electrode body and an electrode body configured so that a terminal member is connected to an electrode sheet. In the latter, concretely, there is a configuration that a positive terminal member is connected to an exposed portion of a positive electrode foil of a positive electrode sheet and a negative terminal member is connected to an exposed portion of a negative electrode foil of a negative electrode sheet. A material of the electrode foil forming the electrode sheet can be appropriately selected in consideration of the active material layer, an electrolyte used in the battery, a material of the electrode foil of the other part, and others. However, a material with a small electric resistivity is preferred. For the positive electrode sheet, a material of the positive electrode foil is aluminum, for example. For the negative electrode sheet, a material of the negative electrode foil is copper, for example.

The "positive electrode sheet" may be configured for example to have a strip-shaped positive active material layer extending in the longitudinal direction (the winding circumferential direction) on a strip-shaped positive electrode foil. The "negative electrode sheet" may be configured for example to have a strip-shaped negative active material layer extending in the longitudinal direction (the winding circumferential direction) on a strip-shaped negative electrode foil. The "separator" may include a first separator located radially outside of the positive electrode sheet in the electrode body and a second separator located radially outside of the negative electrode sheet in the electrode body. It is to be noted that those first separator and second separator may be separate or integral (e.g., a single resin material is folded near a winding axis to be used as a first and second separator).

In the aforementioned battery, preferably, at least one of the edge of the positive active material layer and the edge of the negative active material layer has a cut edge formed when the positive electrode sheet or the negative electrode sheet is produced by cutting, and the edge adjacent portion of the separator includes a cut edge adjacent portion adjacent on a radially outside to the cut edge, and the cut edge adjacent portion includes the suppression portion in a portion located at least in the curved winding portion.

In any one of the batteries, further preferably, the positive electrode sheet includes the positive active material layer extending in a strip shape in the winding circumferential direction and on a strip-shaped positive electrode foil made of aluminum, the negative electrode sheet includes the negative active material layer extending in a strip shape in the winding circumferential direction and on a strip-shaped negative electrode foil made of copper, the separator includes a first separator located radially outside of the positive electrode sheet and a second separator located radially outside of the negative electrode sheet in the flat wound electrode body, the flat wound electrode body is configured such that the positive electrode foil of the positive electrode sheet is exposed (uncoated) on one side in an axial direction along a winding axis and the negative electrode foil of the negative electrode sheet is exposed on the other side in the axial direction, and the suppression portion is provided in a portion at least in each curved portion of a first edge adjacent portion located on the one side of the first separator and a third edge adjacent portion located on the one side of the second separator of the edge adjacent portion.

The edge adjacent portion of the first separator may include a first edge adjacent portion located on the one side in the axial direction and a second edge adjacent portion located on the other side. The edge adjacent portion of the second separator may include a third edge adjacent portion located on the one side in the axial direction and a fourth edge adjacent portion located on the other side.

In the above battery, furthermore, it is preferable that the separator is made of a porous resin material with polymer oriented, and the suppression portion is made so that an orientation state of the polymer in the suppression portion is different from an orientation state of the polymer in other portions.

The "orientation state" indicates the direction of polymer of the resin material and the degree of orientation of polymer. A method for making the orientation state different may include a method for heating a resin material using infrared irradiation without pressing the resin material, a method using a press device for heating a resin material under pressure in a thickness direction.

In the above battery, furthermore, it is preferable that the separator has an orientation that the polymer is oriented in a predetermined direction, and the suppression portion has lower orientation than the other portions.

In the above battery, furthermore, it is preferable that the predetermined direction is a winding circumferential direction of the flat winding electrode body.

In the above battery, furthermore, it is preferable that the suppression portion is a press-heated portion made of the resin material pressed by a heated member in a thickness direction so that the press-heated portion has a thickness thinner than a thickness of the resin material surrounding the press-heated portion.

In any one of the above batteries, furthermore, it is preferable that the suppression portion is configured to extend outward from the edge adjacent portion of the separator in a width direction of the separator and reach an edge of the separator.

In any one of the above batteries, furthermore, it is preferable that the separator includes a plurality of the suppression portions arranged in a separated relationship at spaced intervals from each other in a winding circumferential direction of the flat wound electrode body.

In any one of the above batteries, furthermore, it is preferable that the separator includes: a first separator located on a radial outside of the positive electrode sheet in the flat wound electrode body; and a second separator located on the radial outside of the negative electrode sheet in the flat wound electrode body, wherein the flat wound electrode body is configured such that the positive electrode sheet, the first separator, the negative electrode sheet, and the second separator are wound, in each of the first separator and the second separator, the edge adjacent portion located at each side in an axial direction along a winding axis of the flat wound electrode body includes the suppression portion in at least the curve positioned portion.

In any one of the above batteries, furthermore, it is preferable that the separator is formed with the suppression portion in the edge adjacent portion throughout the winding circumferential direction.

In the above battery, further preferably, the separator includes a first separator located radially outside of the positive electrode sheet and a second separator located radially outside of the negative electrode sheet in the flat wound electrode body, the first separator and the second separator each include two edges on both sides in an axial direction along a winding axis of the flat wound electrode body, the first separator and the second separator include a plurality of suppression portions each having a short linear form extending inward from the edge in the axial direction and obliquely toward the inner circumferential winding side.

Assuming that an angle between the axial direction and an extending direction of each short-linear suppression portion is θ, the angle θ is preferably set in a range of 0° or more and 75° or less)(0°<θ≤75°. With such an angle θ larger than 0°, it is possible to suppress the first separator and the second separator in the battery (the electrode body) from crinkling.

REFERENCE SIGNS LIST

Figure 1:
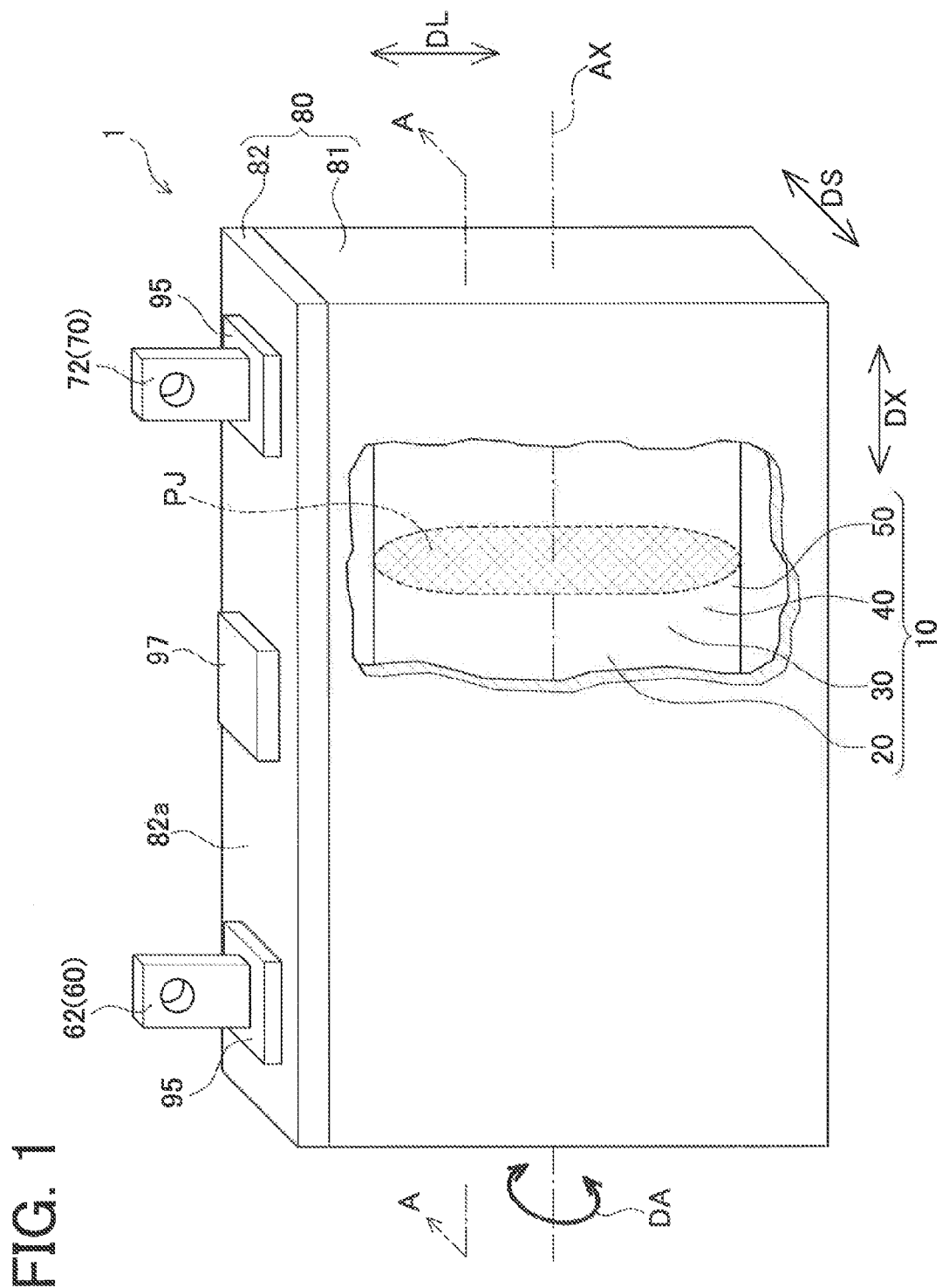
FIG. 1 is a perspective view of a battery in an embodiment.

1 Battery
Electrode body (Flat wound electrode body)
11 Curved winding portion (Curved portion)
20 Positive electrode sheet
21 Positive active material layer
21S First edge (Edge) (of positive active material layer)
21T Second edge (Edge) (of positive active material layer)
30 Negative electrode sheet (Electrode sheet)
31 Negative active material layer (Active material layer)
31S First edge (Edge) (of negative active material layer)
31T Second edge (Edge) (of negative active material layer)
40 First separator (Separator)
41 First edge adjacent portion (Edge adjacent portion)
41R Curve positioned portion (of first edge adjacent portion)
42 Second edge adjacent portion (Edge adjacent portion)
42R Curve positioned portion (of second edge adjacent portion)
46A First edge (of first separator) (Edge (of separator))
46B Second edge (of first separator) (Edge (of separator))
50 Second separator (Separator)
51 Third edge adjacent portion (Edge adjacent portion)
51R Curve positioned portion (of Third edge adjacent portion)
52 Fourth edge adjacent portion (Edge adjacent portion)
52R Curve positioned portion (of fourth edge adjacent portion)
56A First edge (of second separator) (Edge (of separator))
56B Second edge (of second separator) (Edge (of separator))
110 Suppression-portion forming roll (Heated member)
AX Winging Axis
CS1, CS2, CS3, CS4 Suppression portion (Press-heated portion)
DA Winding circumferential direction (Predetermined direction)
DA1 Inner circumferential winding side
DL Major-axis direction
DR2 Radial outside
DT Thickness direction
DW Width direction
DX Axial direction
KM Resin member
T1 First thickness (Thickness (of resin material))
T2 Second thickness (Thickness (of suppression portion))

MODE FOR CARRYING OUT THE INVENTION

Embodiment

A battery in an embodiment of the present invention will be explained referring to accompanying drawings. An electrode body 1 of the embodiment is first explained referring to FIGS. 1 to 4. This battery 1 is provided with a flat wound electrode body 10 including a positive electrode sheet 20, a negative electrode sheet 30, a first separator 40, and a second separator 50, each of which has a strip shape (see FIGS. 1 to 4). The battery 1 is further provided with a positive terminal member 60 connected to the positive electrode sheet 20 of the electrode body 10, a negative terminal member 70 connected to the negative electrode sheet 30 of the electrode body 10, and a battery case 80 internally containing the electrode body 10 (see FIGS. 1 and 2). Besides the above, in the electrode body 10, there is contained an electrolyte (not shown) made of a mixed organic solvent of ethylene carbonate (EC) and ethyl methyl carbonate (EMC) and a solute ($LiPF_6$) added thereto.

The battery case 80 has a case body 81 and a closing lid 82 both of which are made of aluminum. The case body 81 has a bottom-closed rectangular box shape. Between this case body 81 and the electrode body 10, there is interposed an insulation film (not shown) made of resin and bent in a box-like shape.

The closing lid 82 has a rectangular plate shape, which is welded to the case body 81 to close an opening of the case body 81. This closing lid 82 includes a first through hole 82X through which the positive terminal member 60 extends from inside to outside of the battery case 80 and a second through hole 82Y through which the negative terminal member 70 extends from inside to outside of the battery case 80 (see FIG. 2). Further, insulation members 95 made of insulating resin are placed one each between the first through hole 82X and the positive terminal member 60 and between the second through hole 82Y and the negative terminal member 70 to insulate them from each other. On a lid surface 82*a* of the closing lid 82, a rectangular plate-shaped safety valve 97 is sealingly attached in a position between the first through hole 82X and the second through hole 82Y.

Figure 2:
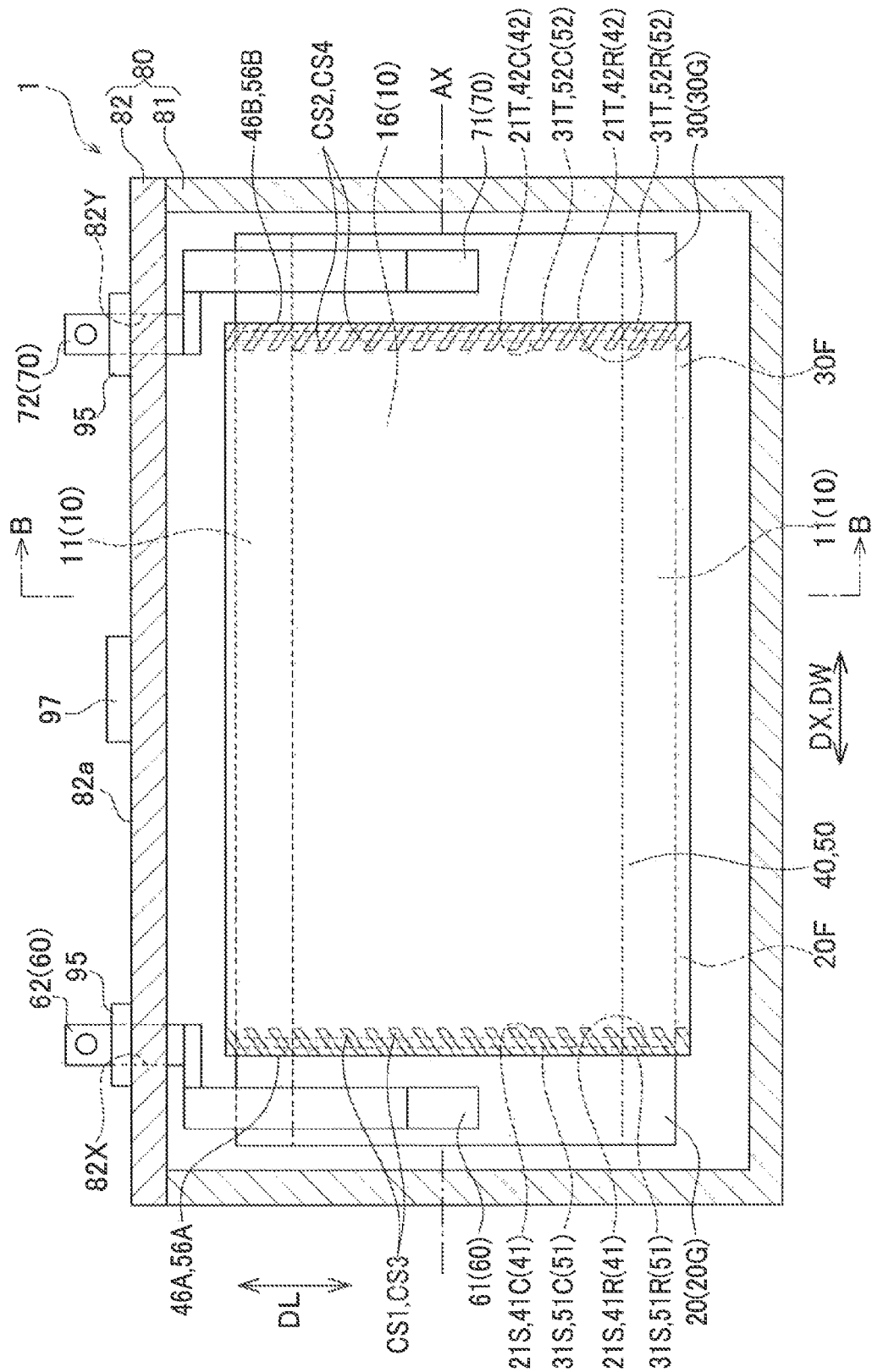
FIG. 2 is a cross sectional view (taken along a line A-A in FIG. 1) of the battery in the embodiment.

The positive terminal member 60 made of a single aluminum material has a crank shape (see FIG. 2). This positive terminal member 60 includes a positive connecting portion 61 located on a base end side (on a side close to the electrode body 10) and connected to the positive electrode sheet 20 (a positive exposed portion 20G mentioned later) and a positive terminal portion 62 located on a leading end side (i.e., outside the battery case 80) to form an external terminal on the positive electrode side of the battery 1 (see FIG. 2).

The negative terminal member 70 made of a single copper material has a crank shape as with the positive terminal member 60 (see FIG. 2). This negative terminal member 70 includes a negative connecting portion 71 located on a base end side (the electrode body 10) and connected to the negative electrode sheet 30 (a negative exposed portion 30G mentioned later) and a negative terminal portion 72 located on a leading end side (i.e., outside the battery case 80) to form an external terminal on the negative electrode side of the battery 1 (see FIG. 2).

The electrode body 10 will be explained below. As shown in a perspective view of FIG. 5, the positive electrode sheet 20 of the electrode body 10 includes a strip-shaped positive electrode foil 28 made of aluminum extending in a longitudinal direction DC and two strip-shaped positive active material layers 21, 21 formed on the positive electrode foil 28 (on both main surfaces of the positive electrode foil 28), each layer 21 extending in the longitudinal direction DC of the positive electrode foil 28. This positive electrode sheet 20 includes a strip-shaped positive exposed portion 20G located on one side (a lower right side in FIG. 5) in a short side direction DB, the portion 20G extending in a strip shape in the longitudinal direction DC in which the positive electrode foil 28 is exposed, and a positive laminated portion 20F located on the other side (an upper left side in FIG. 5) and formed as a lamination body including the positive electrode foil 28 and the positive active material layers 21 laminated one on each surface of the foil 28.

Figure 6:
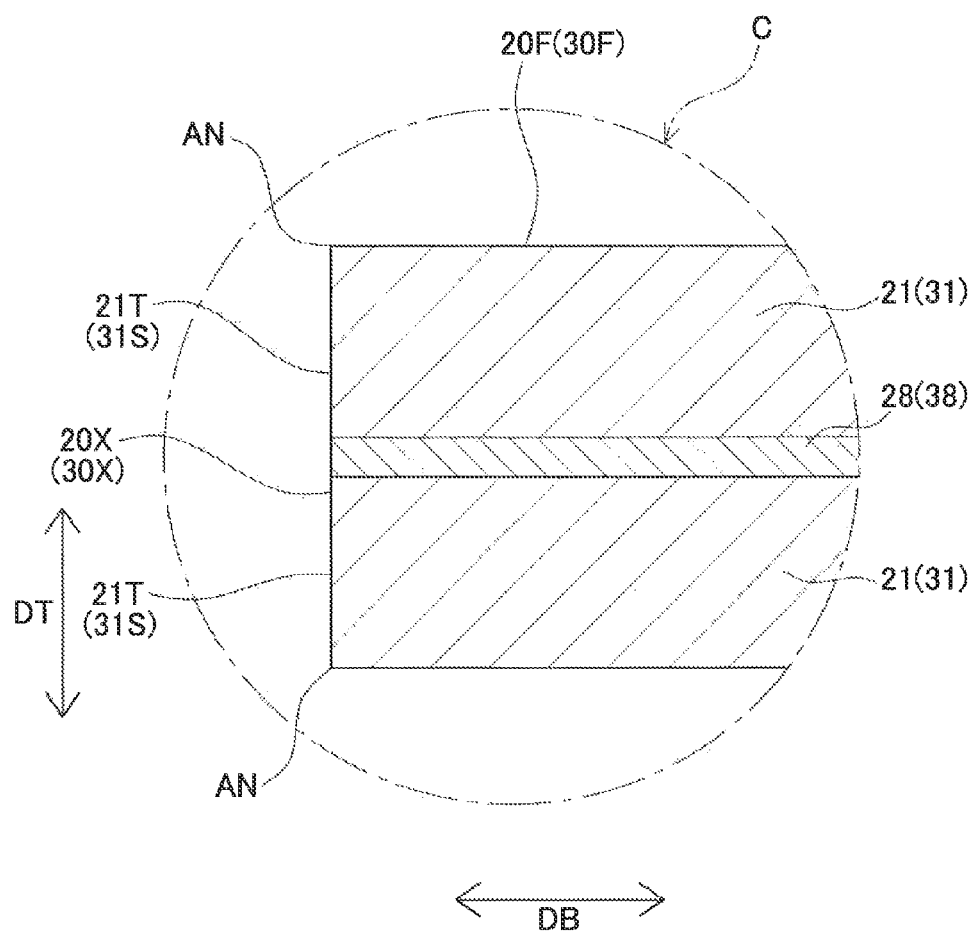
FIG. 6 is a partial enlarged cross sectional view (Part C in FIG. 5) of the positive electrode sheet (the negative electrode sheet) in the embodiment.

Of the end portions of the positive electrode sheet 20 in the short side direction DB, a positive end portion 20X on an opposite side to the positive exposed portion 20G (i.e., an end portion of the positive laminated portion 20F) corresponds to a cut edge formed by cutting a lamination body formed of the positive electrode foil 28 and the positive active material layers 21 in their thickness direction DT when the positive electrode sheet 20 is to be produced. Accordingly, an edge of each positive active material layer 21 (a second edge 21T of each positive active material layer 21 mentioned later) forming the positive end portion 20X is apt to have a sharply angulated corner AN (see FIG. 6).

Figure 5:
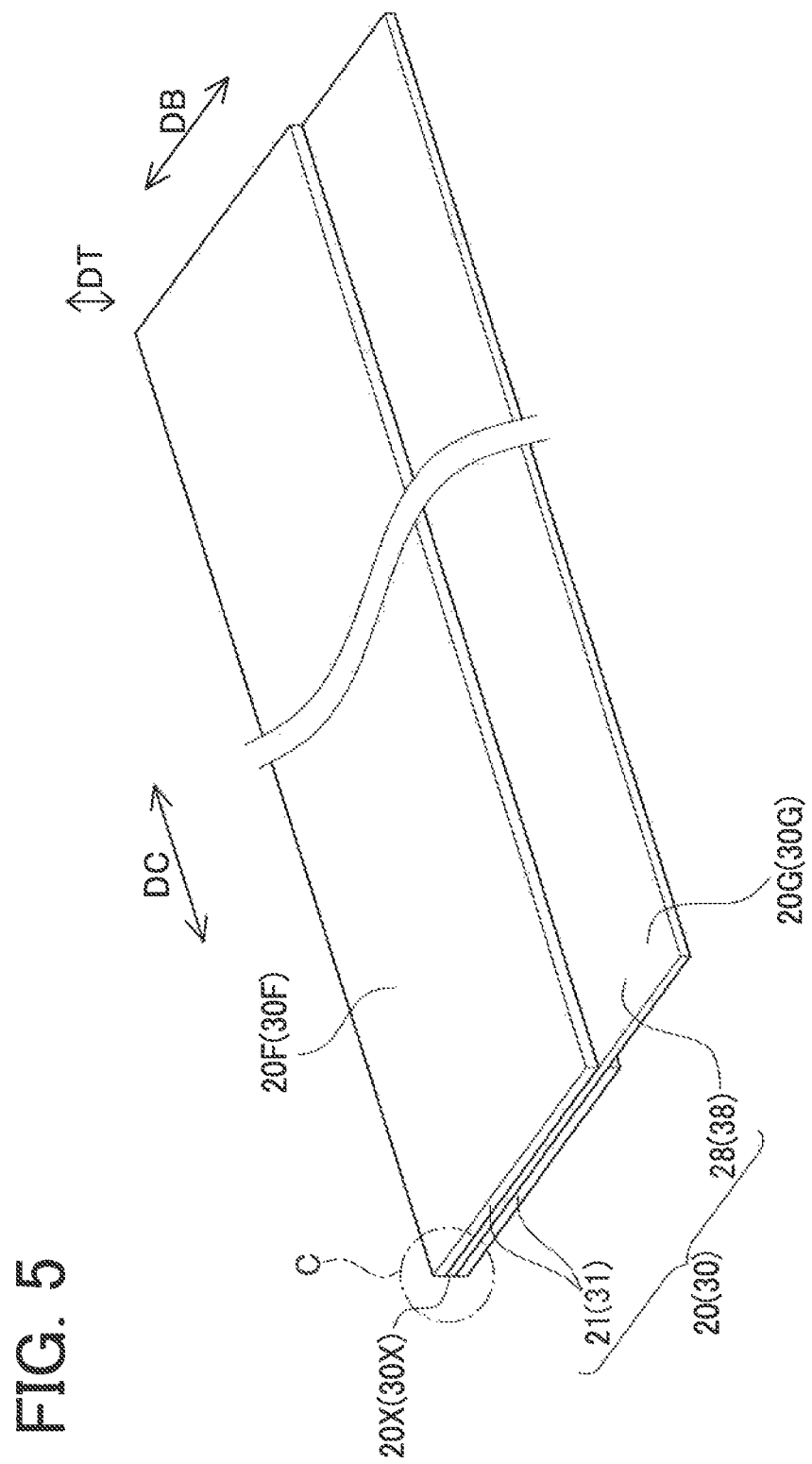
FIG. 5 is a perspective view of a positive electrode sheet (a negative electrode sheet) in the embodiment.

The negative electrode sheet 30 includes, as shown in the perspective view of FIG. 5, a strip-shaped negative electrode foil 38 made of copper extending in the longitudinal direction DC and two strip-shaped negative active material layers 31, 31 formed on the negative electrode foil 38 (on both main surfaces of the negative electrode foil 38), each layer 31 extending in the longitudinal direction DC of the negative electrode foil 38. This negative electrode sheet 30 includes a strip-shaped negative exposed portion 30G located on one side (the lower right side in FIG. 5) in the short side direction DB, the portion 30G extending in a strip shape in the longitudinal direction DC in which the negative electrode foil 38 is exposed, and a negative laminated portion 30F located on the other side (an upper left side in FIG. 5) and formed as a lamination body including the negative electrode foil 38 and the negative active material layers 31 laminated one on each surface of the foil 38.

As with the positive electrode side, of the end portions of the negative electrode sheet 30 in the short side direction DB, a negative end portion 30X on an opposite side to the negative exposed portion 30G (i.e., an end portion of the negative laminated portion 30F) corresponds to a cut edge formed by cutting a lamination body formed of the negative electrode foil 38 and the negative active material layers 31 in their thickness direction DT when the negative electrode sheet 30 is to be produced. Accordingly, an edge of each negative active material layer 31 (a first edge 31S of the negative active material layer 31 mentioned later) forming the negative end portion 30X is apt to have a sharply angulated corner AN (see FIG. 6).

The first separator 40 and the second separator 50 are each made of a strip-shaped porous resin material (a size (a first thickness T1) in the thickness direction DT is 20 μm). This resin material KM is concretely produced in such a manner that a lamination body including two polypropylene (PP) films and one polyethylene (PE) film interposed therebetween is stretched in the longitudinal direction DC under heating, and then cooled while being held in the stretched state. Accordingly, polymer constituting this resin material KM is oriented in the longitudinal direction DC. In case the first separator 40 and the second separator 50 are cracked, a crack is liable to grow or extend in the longitudinal direction DC.

Figure 3:
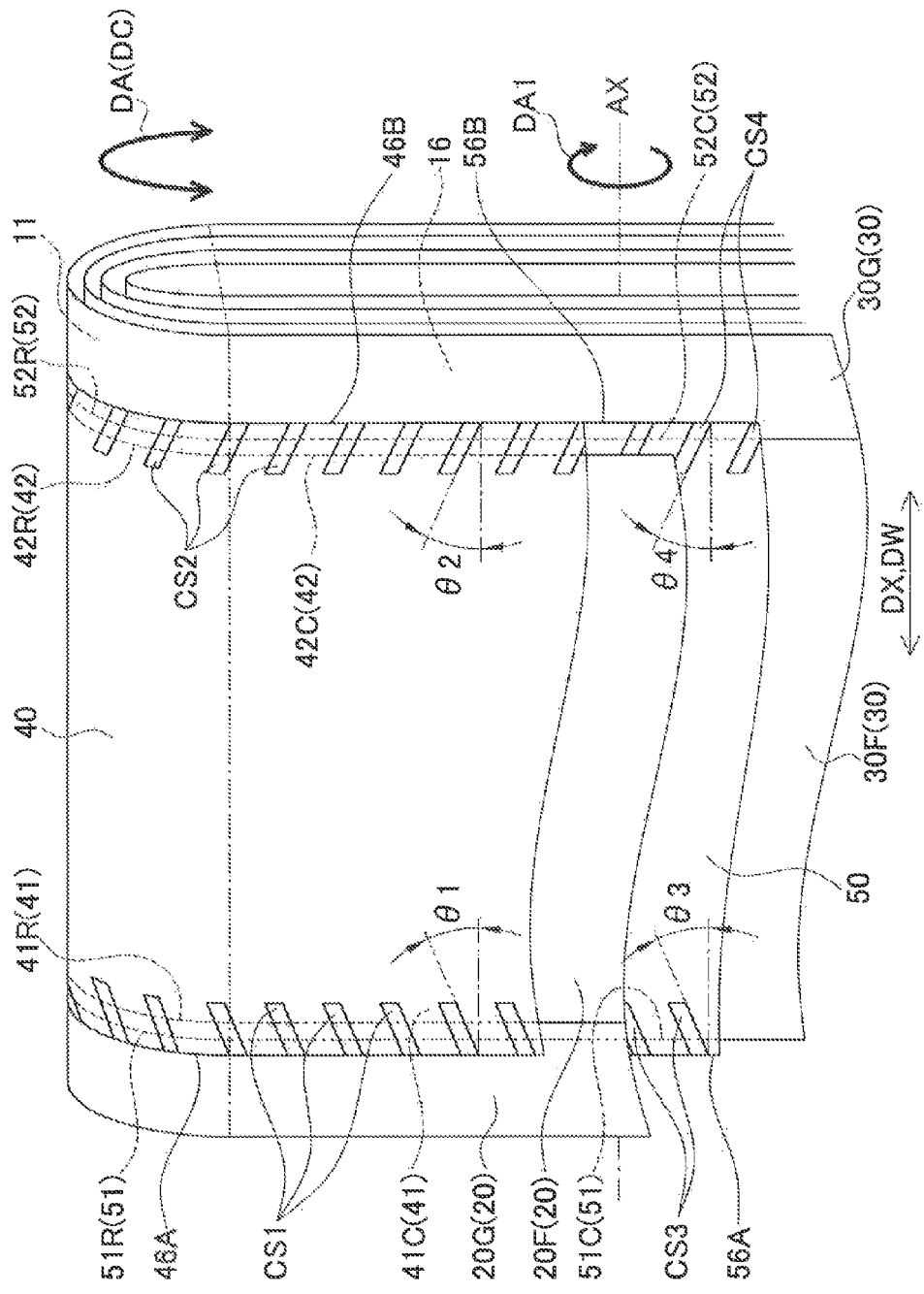
FIG. 3 is a partial cutaway end view of a flat wound electrode body in the embodiment.
Figure 7:
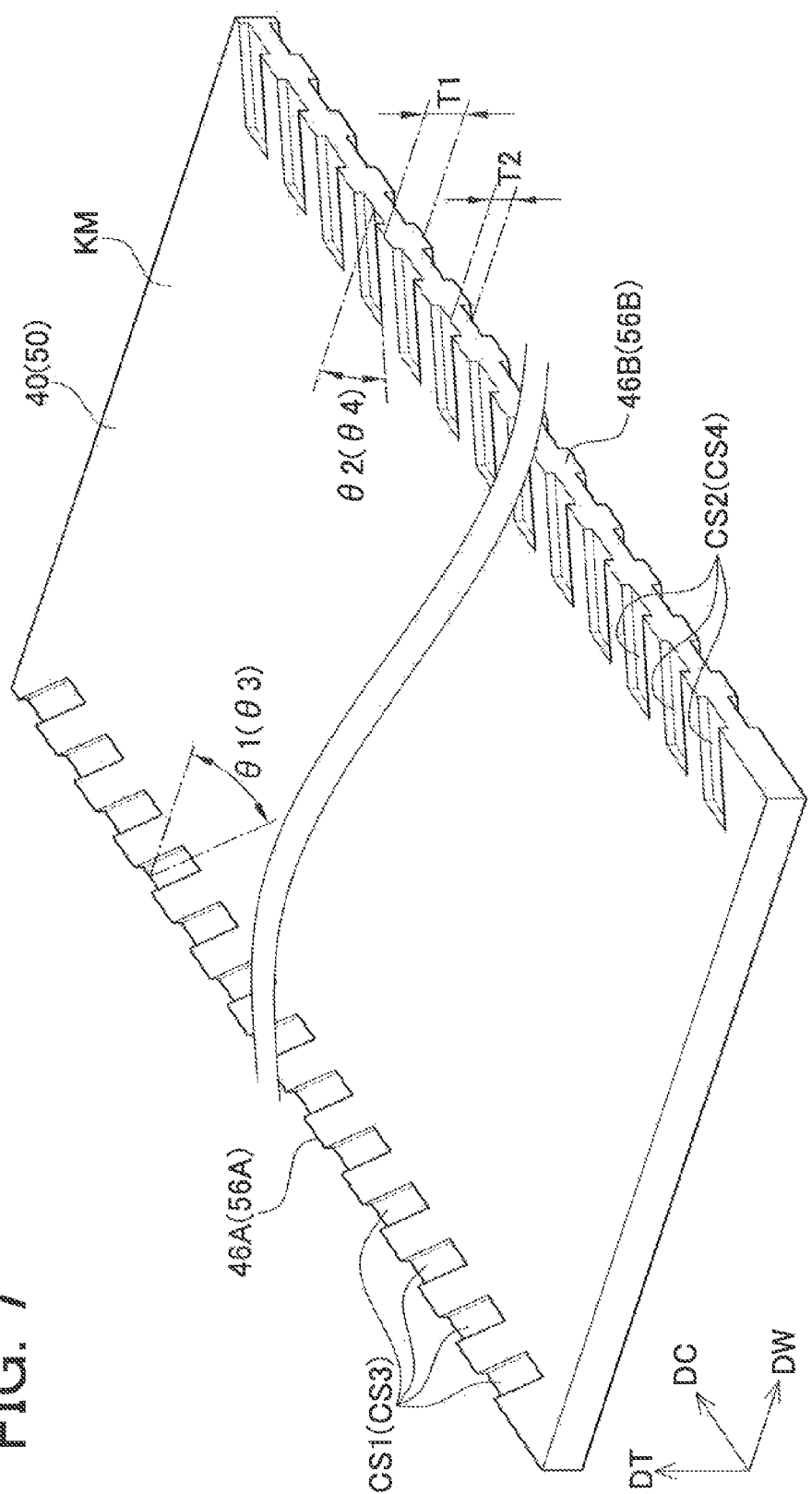
FIG. 7 is a perspective view of a first separator (a second separator) in the embodiment.

Therefore, the first separator 40 is designed as shown in FIG. 7 to have a great number of suppression portions CS1 and CS2 respectively arranged along two edges 46A and 46B which are both edges in a width direction DW. The second separator 50 is designed to have great number of suppression portions CS3 and CS4 respectively arranged along two edges 56A and 56B which are both edges in the short side direction DB. To be concrete, as shown in FIG. 3, a great number of the suppression portions CS1, CS1 are arranged along the first edge 46A of the first separator 40, the first edge 46A being on one side (a left side in FIG. 3) of the first separator 40 in the axial direction DX and extending in a winding circumferential direction DA in the electrode body 10. The suppression portions CS2 are arranged along the second edge 46B of the first separator 40, the second edge 46B being on the other side (a right side in FIG. 3) in the axial direction DX and extending in the winding circumferential direction DA in the electrode body 10. The suppression portions CS3 are arranged along the first edge 56A of the second separator 50, the first edge 56A being on one side (the left side in FIG. 3) of the second separator 50 in the axial direction DX and extending in the winding circumferential direction DA in the electrode body 10. Further, the suppression portions CS4 are arranged along the second edge 45B of the second separator 50, the second edge 56B being on the other side (the right side in FIG. 3) in the axial direction DX and extending in the winding circumferential direction DA in the electrode body 10. The longitudinal direction DC of each of the first separator 40 and the second separator 50 corresponds to the winding circumferential direction DA in the electrode body 10.

Those suppression portions CS1 to CS4 are portions serving to suppress occurrence of cracks or growth of cracks in the winding circumferential direction DA in the first separator 40 and the second separator 50. In the present embodiment, the suppression portions CS1 to CS4 are portions of which an orientation degree of polymer constituting the resin material KM in the winding circumferential direction DA has been lowered by heating. The suppression portions CS1, CS2, CS3, and CS4 are press-heated portions made in such a manner that the resin material KM is pressed in the thickness direction DT by a heated member (a suppression-portion forming roll 110 mentioned later) so that each suppression portion has a thickness T2 (a second thickness) thinner than the first thickness T1 of a remaining portion of the resin material KM (T2<T1) (see FIG. 7).

In the present embodiment, the suppression portions CS1 to CS4 are each arranged in a short linear form (see FIGS. 2, 3, and 7). Herein, the side to each of the first separator 40 and the second separator 50 to be first wound in the winding circumferential direction DA is referred to as an inner circumferential winding side DA1 (see FIG. 3). Thus, each of the suppression portions CS1 of the first separator 40 has a short linear form extending from the first edge 46A of the first separator 40, obliquely with respect to this first edge 46A, inward in the axial direction DX and toward the inner circumferential winding side DA1 (see FIG. 3). In addition, each suppression portion CS1 is designed to extend outward in the width direction DW from a first edge adjacent portion 41 mentioned later, which is indicated by a broken line in FIGS. 2 and 3, to reach the first edge 46A of the first separator 40. In the first edge adjacent portion 41 of the first separator 40, the great number of suppression portions CS1, CS1 are arranged in a separated relationship at equal spaced intervals from each other in the winding circumferential direction DA (see FIGS. 2 and 3).

Each of the suppression portions CS2 of the first separator 40 has a short linear form extending from the second edge 46B of the first separator 40, obliquely with respect to this second edge 46B, inward in the axial direction DX and toward the inner circumferential winding side DA1 (see FIG. 3). In addition, each suppression portion CS2 is designed to extend outward in the width direction DW from a second edge adjacent portion 42 mentioned later, which is indicated by a broken line in FIGS. 2 and 3, to reach the second edge 46B of the first separator 40. In the second edge adjacent portion 42 of the first separator 40, the great number of suppression portions CS2, CS2 are arranged in a separated relationship at equal spaced intervals from each other in the winding circumferential direction DA (see FIGS. 2 and 3).

Each of the suppression portions CS3 of the second separator 50 has a short linear form extending from the first edge 56A of the second separator 50, obliquely with respect to this first edge 56A, inward in the axial direction DX and toward the inner circumferential winding side DA1 (see FIG. 3). In addition, each suppression portion CS3 is designed to extend outward in the width direction DW from a third edge adjacent portion 51 mentioned later, which is indicated by a broken line in FIGS. 2 and 3, to reach the first edge 56A of the second separator 50. In the third edge adjacent portion 51 of the second separator 50, the great number of suppression portions CS3, CS3 are arranged in a separated relationship at equal spaced intervals from each other in the winding circumferential direction DA (see FIGS. 2 and 3).

Each of the suppression portions CS4 of the second separator 50 has a short linear form extending from the second edge 56B of the second separator 50, obliquely with respect to this second edge 56, inward in the axial direction DX and toward the inner circumferential winding side DA1 (see FIG. 3). In addition, each suppression portion CS4 is designed to extend from outward in the width direction DW from a fourth edge adjacent portion 52 mentioned later, which is indicated by a broken line in FIGS. 2 and 3, to reach the second edge 56B of the second separator 50. In the fourth edge adjacent portion 52 of the second separator 50, the great number of suppression portions CS4, CS4 are arranged in a separated relationship at equal spaced intervals from each other in the winding circumferential direction DA (see FIGS. 2 and 3).

Regarding each of the above short-linear suppression portion CS1 to CS4, assuming that angles between the extending direction of the suppression portions CS1 to CS4 and the short side direction DB (the axial direction DX of the electrode body 10) are respectively referred to as θ1 to θ4, these angles θ1 to θ4 are set in a range of 0° or more and 75° or less (θ1, θ2, θ3, and θ4=75° in the present embodiment) (see FIGS. 3 and 7).

Figure 4:
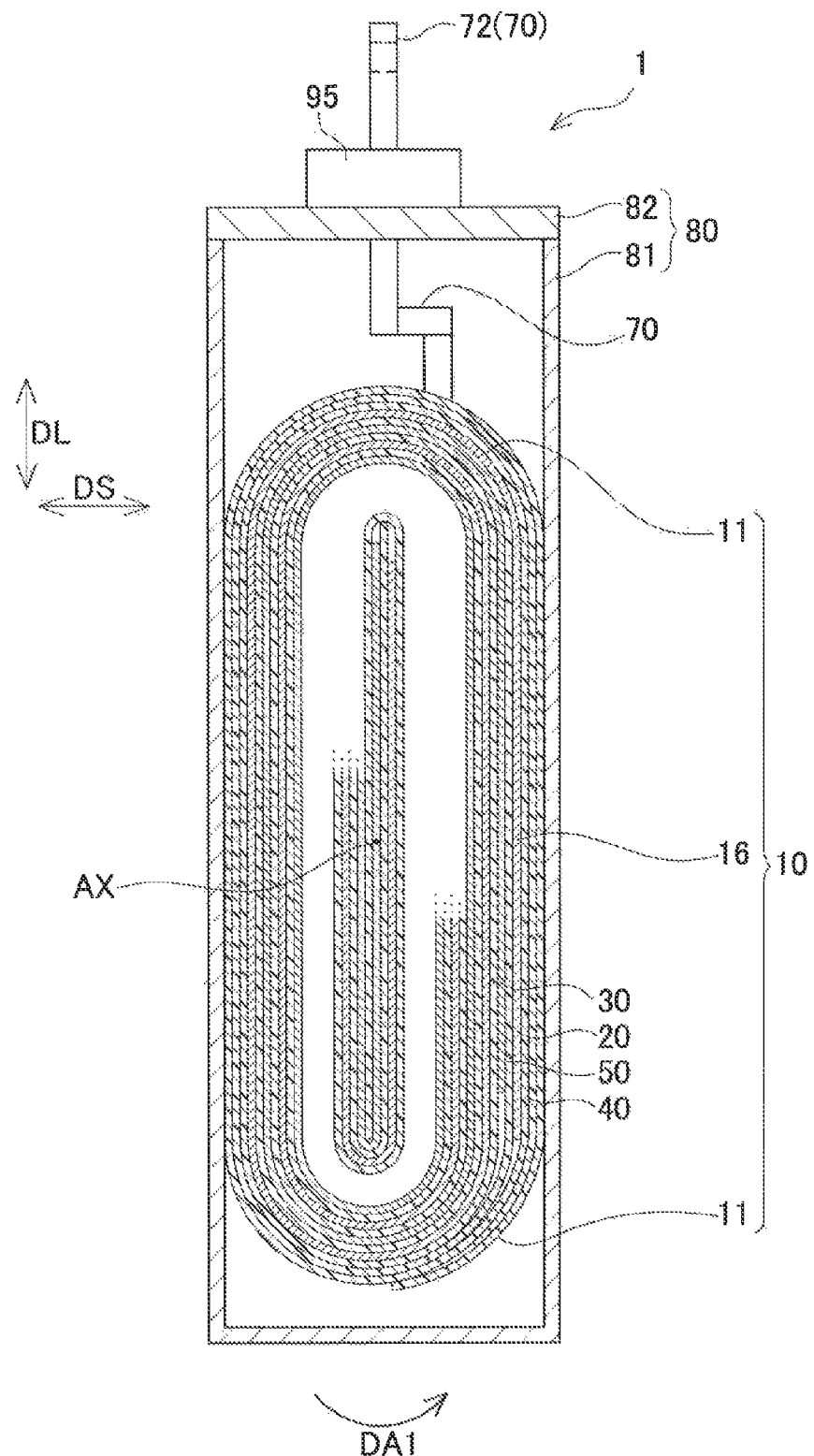
FIG. 4 is a cross sectional view (taken along a line B-B in FIG. 2) of the battery in the embodiment.

In the electrode body 10 made up by winding the aforementioned first separator 40, negative electrode sheet 30, second separator 50, and positive electrode sheet 20, a cross section PJ (a hatched area in FIG. 1) of the electrode body 10 taken perpendicular to the winding axis AX has a flat oval or elliptic shape (see FIGS. 1 and 4). The longitudinal direction DC of each of the positive electrode sheet 20 and the negative electrode sheet 30 corresponds to the winding circumferential direction DA in the electrode body 10. The electrode body 10 includes two curved winding portions 11, 11 located at both ends of the oval shape defining the cross section PJ in the major axis direction DL and central winding portions 16 each interposed between the two curved winding portions 11, 11 in the major-axis direction DL (see FIG. 4). In the curved winding portions 11, the first separator 40, negative electrode sheet 30, second separator 50, and positive electrode sheet 20 are placed in a curved or round form. In the central winding portions 16, the positive electrode sheet 20 and others are placed in a flat plate form.

Figure 8:
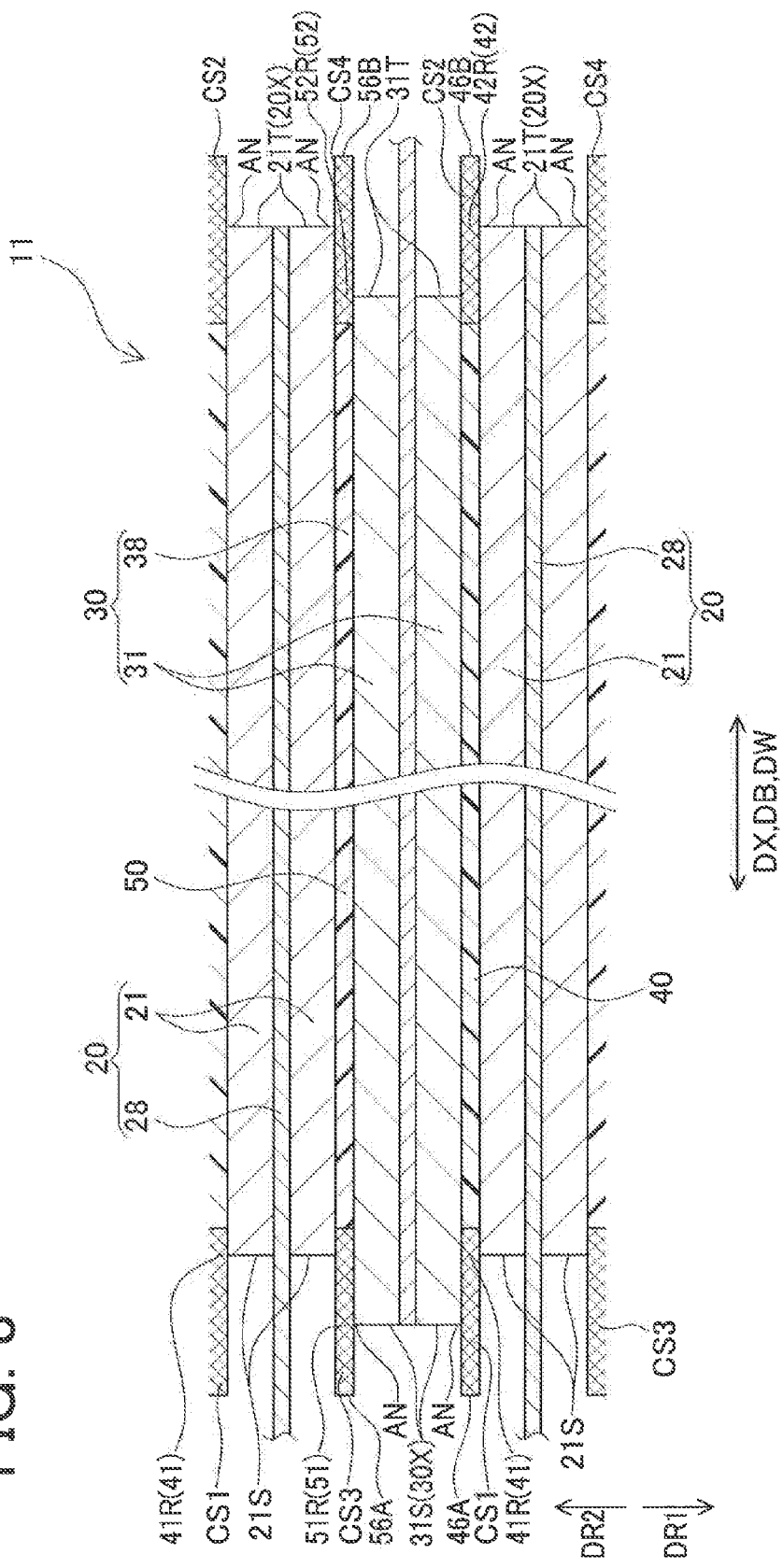
FIG. 8 is a partial enlarged cross sectional view of a part (a curved winding portion) of a cross section of the flat wound electrode body taken in parallel to a major-axis direction and a winding axis in the embodiment.

FIG. 8 is an enlarged cross sectional view showing a part (the curved winding portion 11) of the electrode body 10 in enlarged cross section parallel to the major-axis direction DL and the winding axis AX. In this FIG. 8, since the winding axis AX of the electrode body 10 is located below FIG. 8 (i.e., not illustrated in FIG. 8), a lower side in FIG. 8 corresponds to a radial inside (an inner circumferential side) DR1 of the electrode body 10 and an upper side in FIG. 8 corresponds to a radial outside (an outer circumferential side) DR2.

In the electrode body 10 of the battery 1 in the present embodiment, the first separator 40, the negative electrode sheet 30, the second separator 50, and the positive electrode sheet 20 are laminated in this order and wound together (see FIG. 8). Accordingly, in the electrode body 10, the first separator 40 is positioned on the radial outside DR2 of the positive electrode sheet 20 and the second separator 50 is positioned on the radial outside DR2 of the negative electrode sheet 30, respectively (see FIG. 8).

In this electrode body 10, the positive electrode sheet 20 is placed so that the aforementioned positive exposed portion 20G is arranged on one side (a left side in FIG. 8) in the axial direction DX along the winding axis AX and the aforementioned positive laminated portion 20F is arranged on the other side (a right side in FIG. 8) in the axial direction DX, respectively (see FIG. 8). Accordingly, referring to the positive electrode sheet 20, the aforementioned positive end portion 20X (see FIG. 6) is positioned on the other side in the axial direction DX (see FIG. 8). Of each positive active material layer 21 of the positive electrode sheet 20, an edge being on the one side in the axial direction DX and extending in the winding circumferential direction DA (perpendicular to a drawing sheet of FIG. 8) is referred to as a first edge 21S of the positive active material layer 21 and an edge being on the other side in the axial direction DX and extending in the winding circumferential direction DA is referred to as a second edge 21T of the positive active material layer 21. Of those first edge 21S and second edge 21T, the first edge 21T forming the positive end portion 20X is a cut edge and thus is apt to have a sharply angulated corner AN (see FIG. 8).

In the electrode body 10, furthermore, the negative electrode sheet 30 is placed so that the aforementioned negative exposed portion 30G is arranged on the other side (the right side in FIG. 8) in the axial direction DX and the aforementioned negative laminated portion 30F is arranged on the one side (the left side in FIG. 8) in the axial direction DX, respectively (see FIG. 8). Accordingly, referring to the negative electrode sheet 30, the aforementioned negative end portion 30X (see FIG. 6) is positioned on the one side in the axial direction DX (see FIG. 8). Of each negative active material layer 31 of the negative electrode sheet 30, an edge being on the one side in the axial direction DX and extending in the winding circumferential direction DA (perpendicular to the drawing sheet of FIG. 8) is referred to as a first edge 31S of the negative active material layer 31 and an edge being on the other side in the axial direction DX and extending in the winding circumferential direction DA is referred to as a second edge 31T of the negative active material layer 31. Of those first edge 31S and second edge 31T, the first edge 31S forming the negative end portion 30X is a cut edge and thus is apt to have a sharply angulated corner AN (see FIG. 8).

In the electrode body 10, the first separator 40 is wider than the positive active material layer 21 adjacent thereto on the radial inside DR1 and is placed to cover the entire active material layer 21. Thus, the first separator 40 includes a first edge adjacent portion 41 and a second edge adjacent portion 42 (see FIG. 8) placed so that the first edge adjacent portion 41 is close to the first edge 21S of the positive active material layer 21 adjacent on the radial inside DR1 in the electrode body 10 from the radial outside (the outer circumferential side) DR2 (an upper side in FIG. 8) and the second edge adjacent portion 42 is close to the second edge 21T of the same positive active material layer 21 from the radial outside DR2 (see FIG. 8). The first edge adjacent portion 41 positioned on the one side in the axial direction DX (the width direction DW) includes, as shown in FIG. 3, curve positioned portions 41R extending in the winding circumferential direction DA of the first separator 40 and being located in the curved winding portions 11 and centrally-positioned portions 41C located in the central winding portions 16, these portions 41R and 41C alternately appearing in the winding circumferential direction DA. Further, the second edge adjacent portion 42 positioned on the other side in the axial direction DX (the width direction DW) includes, as with the first edge adjacent portion 41, curve positioned portions 42R extending in the winding circumferential direction DA of the first separator 40 and being located in the curved winding portions 11 and centrally-positioned portions 42C located in the central winding portions 16, these portions 42R and 42C alternately appearing in the winding circumferential direction DA (see FIG. 3).

The electrode body 10 is configured so that the aforementioned first separator 40 shown in FIG. 7 is wound around the winding axis AX. Therefore, as shown in FIGS. 2 and 3, the great number of suppression portions CS1, CS1 mentioned above are provided over the entire first edge adjacent portion 41 and the great number of suppression portions CS2, CS2 are provided over the entire second edge adjacent portion 42, respectively, in the first separator 40.

In the electrode body 10, the second separator 50 is wider than the negative active material layer 31 adjacent thereto on the radial inside DR1 and placed to cover the entire negative active material layer 31. Thus, the second separator 50 includes a third edge adjacent portion 51 and a fourth edge adjacent portion 52 (see FIG. 8) placed so that the third edge adjacent portion 51 is close to the first edge 31S of the negative active material layer 31 adjacent on the radial inside DR1 in the electrode body 10 from the radial outside DR and the fourth edge adjacent portion 52 is close to the second edge 31T of the same negative active material layer 31 from the radial outside DR (see FIG. 8). The third edge adjacent portion 51 positioned on the one side in the axial direction DX (the width direction DW) includes, as shown in FIG. 3, curve positioned portions 51R extending in the winding circumferential direction DA of the second separator 50 and being located in the curved winding portions 11 and centrally-positioned portions 51C located in the central winding portions 16, these portions 51R and 51C alternately appearing in the winding circumferential direction DA. Further, the fourth edge adjacent portion 52 positioned on the other side in the axial direction DX (the width direction DW) includes, as with the third edge adjacent portion 51, curve positioned portions 52R extending in the winding circumferential direction DA of the second separator 50 and being located in the curved winding portions 11 and centrally-positioned portions 52C located in the central winding portions 16, these portions 52R and 52C alternately appearing in the winding circumferential direction DA (see FIG. 3).

The electrode body 10 is also configured so that the aforementioned second separator 50 shown in FIG. 7 is wound around the winding axis AX, as with the first separator 40. Therefore, as shown in FIGS. 2 and 3, the great number of suppression portions CS3, CS3 mentioned above are provided over the entire third edge adjacent portion 51 and the great number of suppression portions CS4, CS4 are provided over the entire fourth edge adjacent portion 52, respectively, in the second separator 50.

Figure 9:
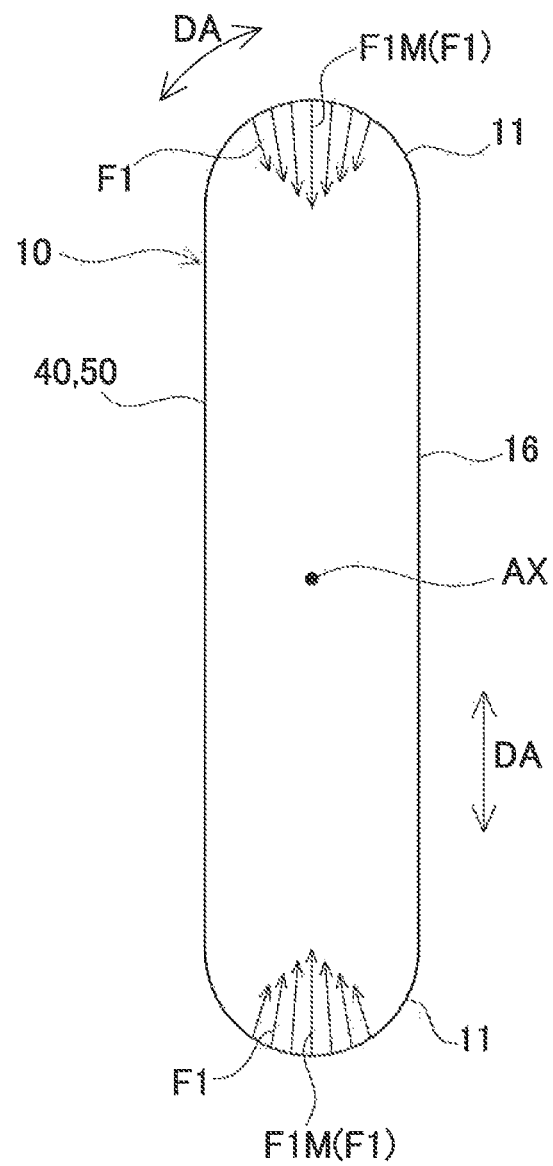
FIG. 9 is an explanatory view to explain stress applied to a separator of the flat wound electrode body when the separator undergoes thermal shrinkage in a longitudinal direction.

Meanwhile, consideration is made on the case where the electrode body 10 including the curved winding portions 11 and the central winding portions 16 and having an oval cross section increases its internal temperature due to overcharge, for example, and thus the separators 40 and 50 thermally contract or shrink in the winding circumferential direction DA. When heated, each of the separators 40 and 50 thermally shrinks in the winding circumferential direction DA similarly in the curved winding portions 11 and in the central winding portions 16. However, since the electrode body 10 has an oval shape, parts of the separators 40 and 50 in the central winding portions 16 are not subjected to radial stress acting toward the winding axis AX as shown in FIG. 9. On the other hand, parts of the separators 40 and 50 in the curved winding portions 11 are subjected to stress F1 acting toward the radial inside. It is particularly conceived that, of this stress F1, stress F1M at each position farthest from the winding axis AX is maximum.

Figure 10:
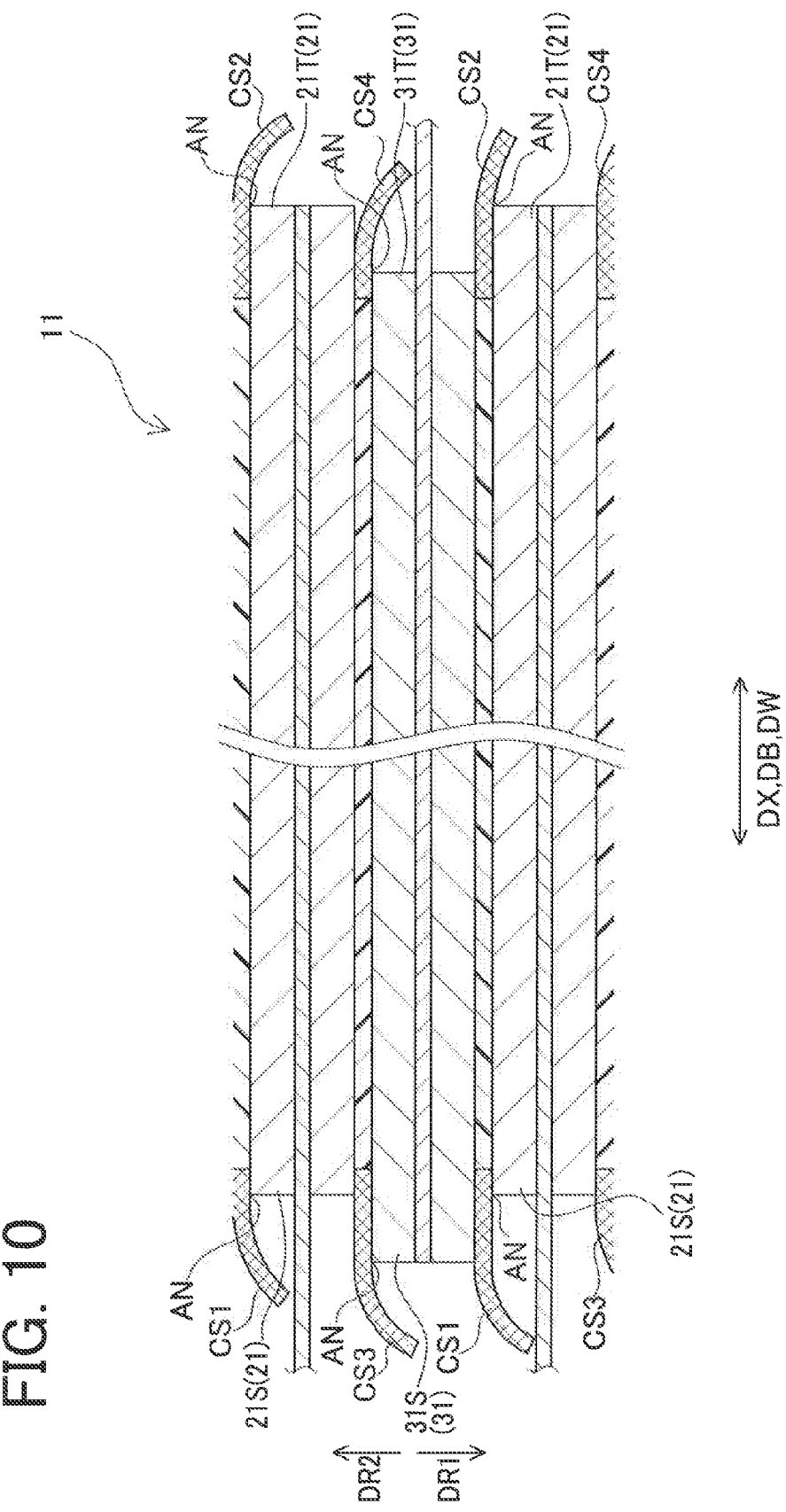
FIG. 10 is an enlarged cross sectional view of the curved winding portion of the flat wound electrode body after the separator undergoes thermal shrinkage in the longitudinal direction.

Accordingly, it is conceived that parts of the separators in the curved winding portions 11 of the electrode body 10 are likely to strongly contact the edges (the corners) of the positive active material layer (or the negative active material layer) adjacent on the radial inside DR1. Specifically, in the electrode body 10 with the separators 40 and 50 having thermally shrunk, as shown in FIG. 10, parts of the separator 40 in the curved winding portions 11 make strong contact with the corners of the edges 21S, 21T of the active material layer 21 adjacent on the radial inside DR1 and parts of the separator 50 in the curved winding portions 11 make strong contact with the corners of the edges 31S, 31T of the active material layer 31 adjacent on the radial inside DR1.

Consequently, a crack is generated in the curve positioned portion 41R of the first edge adjacent portion 41 or the curve positioned portion 42R of the second edge adjacent portion 42 in the first separator 40, with which the corner AN of the positive active material layer 21 contact, or, a crack is generated in the curve positioned portion 51R of the third edge adjacent portion 51 or the curve positioned portion 52R of the fourth edge adjacent portion 52 in the second separator 50, with which the corner AN of the negative active material layer 31 contact. In the first separator 40 and the second separator 50, the polymer constituting the resin material KM forming the separators 40 and 50 is oriented in the winding circumferential direction DA (the longitudinal direction DC) and thus the crack may grow in the winding circumferential direction DA.

Figure 11:
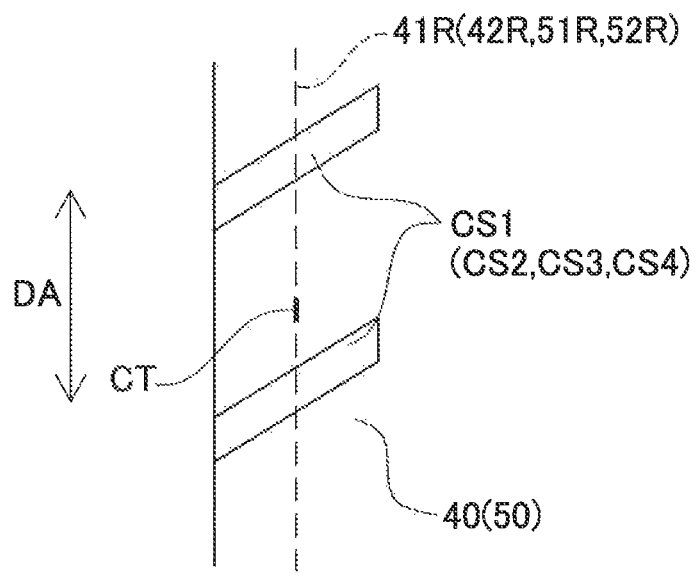
FIG. 11 is an explanatory view of a state where a crack has occurred in a curved edge adjacent portion of the separator.
Figure 12:
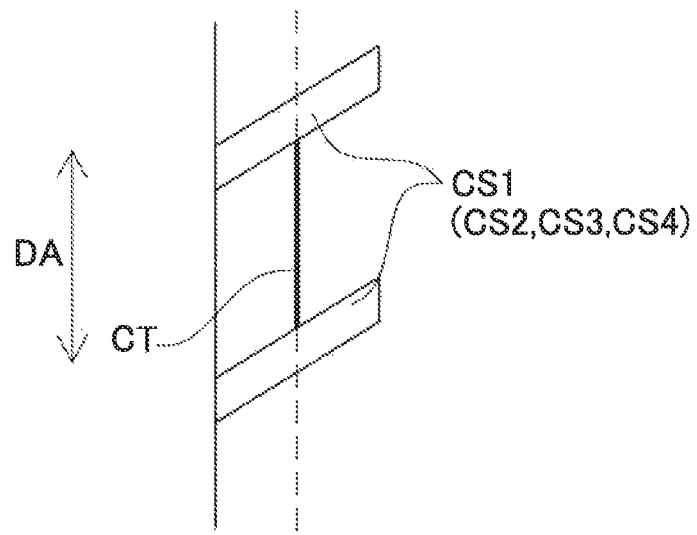
FIG. 12 is an explanatory view of a state of a crack having occurred and grown in the curved edge adjacent portion of the separator.

In the present embodiment, however, the separators 40 and 50 are formed with the suppression portions CS1 to CS4 respectively over the entire edge adjacent portions 41, 42, 51, and 52 including the curve positioned portions 41R, 42R, 51R, and 52R. Those suppression portions CS1 to CS4 themselves are hard to be cracked. As shown in FIG. 11, for example, even when a crack CT is generated in a portion other than the suppression portions CS1 (a portion between the suppression portions CS1) of the curve positioned portions 41R of the first edge adjacent portion 41 of the first separator 40, it is possible to suppress growth of the crack CT within a size corresponding to the interval between the suppression portions CS1 in the winding circumferential direction DA at a maximum as shown in FIG. 12. The same applies to the curve positioned portions 42R of the second edge adjacent portion 42, and the curve positioned portions 51R of the third edge adjacent portion 51 and the curve positioned portions 52R of the fourth edge adjacent portion 52 of the second separator 50.

In the battery 1 in the present embodiment, as above, the first separator 40 includes the suppression portions CS1 in the curve positioned portions 41R of the first edge adjacent portion 41, positioned in the curved winding portions 11 of the electrode body 10, and includes the suppression portions CS2 in the curve positioned portions 42R of the second edge adjacent portion 42, positioned in the curved winding portions 11 of the electrode body 10. Further, the second separator 50 includes the suppression portions CS3 in the curve positioned portions 51R of the third edge adjacent portion 51 and includes the suppression portions CS4 in the curve positioned portions 52R of the fourth edge adjacent portion 52. Therefore, even when the internal temperature of the battery 1 increases in use and the separators (the first separator 40 and the second separator 50) thermally shrink in the winding circumferential direction DA, it is possible to prevent generation or growth of cracks in the edge adjacent portions 41, 42, 51, and 52 respectively provided with the suppression portions CS1 to CS4, thereby preventing the occurrence of a short circuit between the positive electrode sheet 20 and the negative electrode sheet 30 through the cracks.

In the separators 40 and 50, the orientation states of the suppression portions CS1 to CS4 are different from the orientation states of remaining portions. To be concrete, the degree of orientation of the suppression portions CS1 to CS4 is lower than the degree of orientation of the remaining portions. Accordingly, it is possible to reliably prevent the generation of cracks in the suppression portions CS1 to CS4 of the separators 40 and 50 as compared with the remaining portions other than the suppression portions CS1 to CS4. Even if a crack CT occur and grow along the polymer orientation in the remaining portions other than the suppression portions CS1 to CS4 (e.g., the portions between the great number of suppression portions CS1 and CS1 shown in FIGS. 11 and 12), the suppression portions CS1 to CS4 can reliably suppress growth of the crack CT.

Furthermore, the separators 40 and 50 have the degree of orientation that polymer is orientated in the winding circumferential direction DA (the longitudinal direction DC); however, the degree of orientation is lower in the suppression portions CS1 to CS4 than in the other portions. The suppression portions CS1 to CS4 therefore can surely prevent the generation of a crack or cracks. Even if a crack occurs and grows in the winding circumferential direction DA in another portion other than the suppression portions CS1 to CS4, the suppression portions CS1 to CS4 can reliably suppress growth of this crack (see FIGS. 11 and 12).

In the separators 40 and 50 of the battery 1 in the present embodiment, the polymer is oriented in the winding circumferential direction DA of the electrode body 10. Thus, when a crack is generated in the edge adjacent portions 41, 42, 51, and 52 of the thermally shrunk separators 40 and 50, the crack is prone to grow in the winding circumferential direction DA, causing a short circuit of the battery. In the battery 1, however, the suppression portions CS1 to CS4 can reliably prevent growth of the crack in the winding circumferential direction DA.

In the battery 1 in the present embodiment, meanwhile, the corner AN of the second edge 21T which is the aforementioned cut edge of the edges of each positive active material layer 21 is apt to be sharply angulated (see FIG. 8). Thus, when the first separator 40 thermally shrinks in the winding circumferential direction DA, the stress (the aforementioned stress F1 in FIG. 9) occurring in the first separator 40 in the curved winding portions 11 is likely to concentrate on the tip of the sharply angulated corner AN. Accordingly, a crack is easily generated in the second edge adjacent portion 42 (the curve positioned portions 42R) close to the second edge 21T particularly in the first separator 40. Similarly, the corner AN of the first edge 31S which is the cut edge of the edges of each negative active material layer 31 is apt to be sharply angulated (see FIG. 8). Thus, when the second separator 50 thermally shrinks in the winding circumferential direction DA, a crack is easily generated in the third edge adjacent portion 51 (the curve positioned portions 51R) close to the first edge 31S.

In the battery 1 in the present embodiment, however, the suppression portions CS2 are provided in the curve positioned portions 42R of the second edge adjacent portion 42 close to the cut edge, that is, the second edge 21T. Also, the suppression portions CS3 are provided in the curve positioned portions 51R of the third edge adjacent portion 51 close to the cut edge, that is, the first edge 31S. This can reliably prevent a crack from occurring or growing in the curve positioned portions 41R and 51R which are liable to be cracked more easily than the other portions and hence prevent the generation of a short circuit between the positive electrode sheet 20 and the negative electrode sheet 30.

In the battery 1 in the present embodiment, the positive electrode foil 28 of the positive electrode sheet 20 is made of aluminum and the negative electrode foil 38 of the negative electrode sheet 30 is made of copper having a higher heat conductivity than aluminum. As the internal temperature of the battery 1 increases, accordingly, a temperature distribution is generated in the electrode body 10. Specifically, since the positive exposed portion 20G is less likely to release heat as compared with the negative exposed portion 30G, a part of the electrode body 10, near the positive exposed portion 20G on the one side (the left side in FIG. 3) in the axial direction DX, is subjected to high temperature. In this electrode body 10, therefore, parts of the first separator 40 and the second separator 50 in the vicinity of the first edge adjacent portion 41 and the third edge adjacent portion 51 close to the positive exposed portion 20G is apt to thermally shrink more largely than opposite parts in the vicinity of the second edge adjacent portion 42 and the fourth edge adjacent portion 52. Thus, the curve positioned portions 41R of the first edge adjacent portion 41 and the curve positioned portions 51R of the third edge adjacent portion 51 are prone to be cracked.

In the battery 1, however, the suppression portions CS1 are provided in the first edge adjacent portion 41 including the curve positioned portions 41R and the suppression portions CS3 are provided in the third edge adjacent portion 51 including the curve positioned portions 51R. This can reliably prevent cracks from occurring or growing in the curve positioned portions 41R of the first edge adjacent portion 41 and 51R of the third edge adjacent portion 51 which are liable to be cracked more easily than the other portions and hence prevent the generation of a short circuit between the positive electrode sheet 20 and the negative electrode sheet 30.

The suppression portions CS1 to CS4 are the aforementioned press-heated portions. Since the porous resin material KM has a reduced thickness by pressing in the thickness direction DT, the density of the resin material KM can be increased by just that much. The resin material KM can be made to readily conduct heat by pressing, so that the heat can be more reliably conducted to the polymer in the suppression portions CS1 to CS4 than in the case where the resin material KM is heated for example by use of infrared irradiation without pressing. Accordingly, the degree of orientation in the winding circumferential direction DA (the longitudinal direction DC) can be decreased more easily. The suppression portions CS1 to CS4 therefore can reliably prevent cracks from occurring or growing in the curve positioned portions 41R, 42R, 51R, and 52R provided with the suppression portions CS1 to CS4 and thus prevent the generation of a short circuit between the positive electrode sheet 20 and the negative electrode sheet 30.

Figure 13:
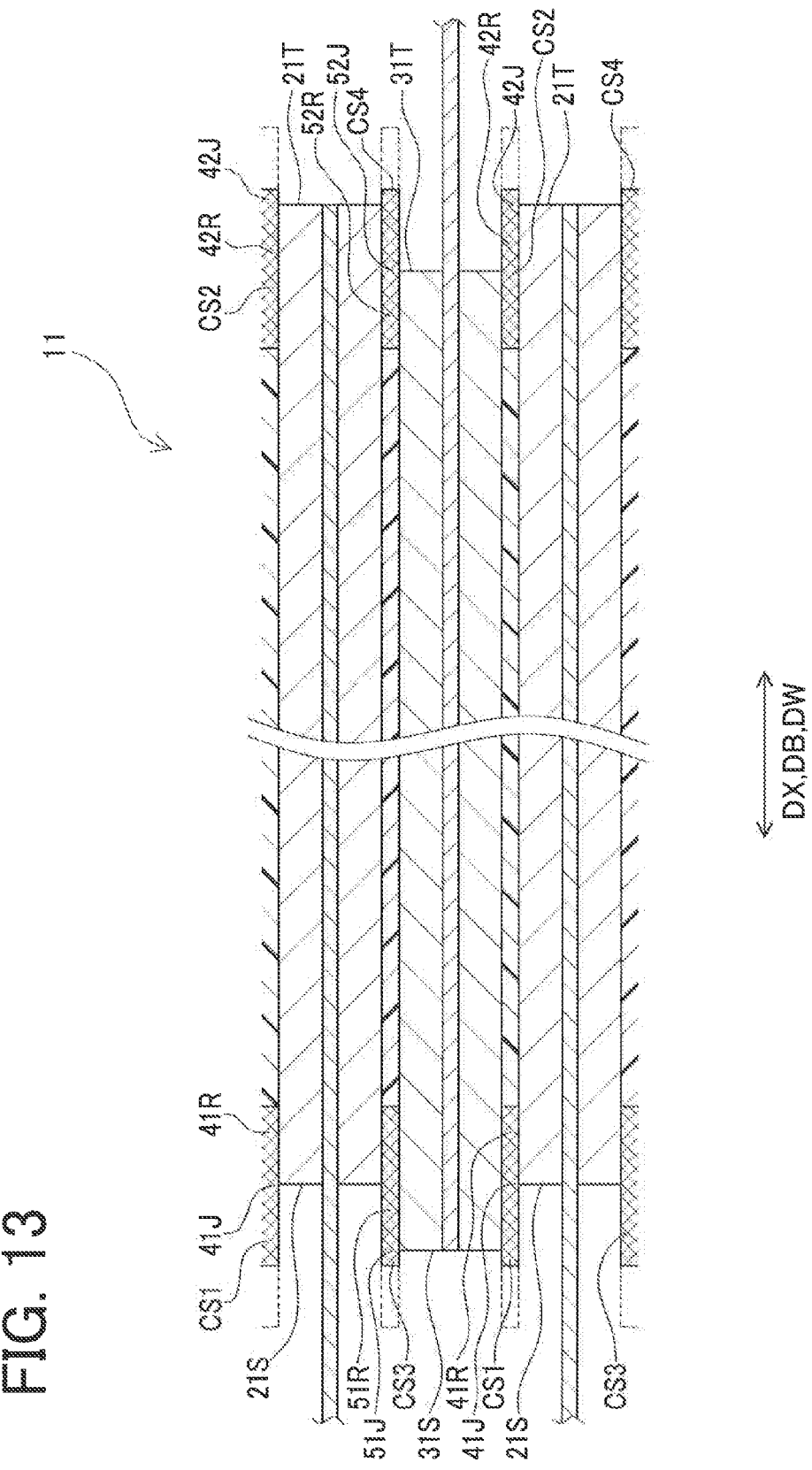
FIG. 13 is an enlarged cross sectional view of the curved winding portion of the flat wound electrode body after the separator also undergoes thermal shrinkage in an axial direction (a short side direction)

Meanwhile, in a case where the internal temperature of the battery 1 increases, the first separator 40 may also thermally shrink in the axial direction DX (the width direction DW) and become narrow in width. FIG. 13 is an enlarged cross sectional view showing the curved winding portion 11 in this case. In a case where the first separator 40 is deformed from a state indicated by a broken line into the shape indicated by a solid line due to thermal shrinkage in the axial direction DX, the curve positioned portion 41R of the first edge adjacent portion 41 of the first separator 40 close to the first edge 21S of the positive active material layer 21 is displaced more inward in the axial direction DX (rightward in FIG. 13) than the first edge 21S of the positive active material layer 21. In other words, in the first separator 40 after shrinkage, a portion 41J close to the first edge 21S of the positive active material layer 21 is in a position displaced more outward in the axial direction DX (leftward in FIG. 13) than the curve positioned portion 41R of the first edge adjacent portion 41. Thus, this portion 41J is apt to be easily cracked (see FIG. 13).

In the battery 1 in the present embodiment, however, the suppression portions CS1 are each designed to extend outward from the first edge adjacent portion 41 in the width direction DW and reach the first edge 46A of the first separator 40. In the battery 1, therefore, even when the first separator 40 thermally shrinks in the axial direction DX, the suppression portions CS1 are present near the first edge 21S of each positive active material layers 21.

The curve positioned portions 42R of the second edge adjacent portion 42 of the first separator 40 are displaced more inward in the axial direction DX (leftward in FIG. 13) than the second edge 21T of the positive active material layer 21. Thus, the portion 42J close to the second edge 21T of the positive active material layer 21 is apt to be easily cracked (see FIG. 13). However, the suppression portions CS2 are each designed to extend outward from the second edge adjacent portion 42 in the width direction DW and reach the second edge 46B of the first separator 40. The suppression portions CS2 are thus present near the second edges 21T of each positive active material layer 21.

The second separator 50 may also thermally shrink in the axial direction DX (the width direction DW) and become narrow in width. Specifically, as shown in FIG. 13, in a case where the second separator 50 is deformed from a state indicated by a broken line into the shape indicated by a solid line due to thermal shrinkage in the axial direction DX, the curve positioned portion 51R of the third edge adjacent portion 51 of the second separator 50 close to the first edge 31S of the negative active material layer 31 is displaced more inward in the axial direction DX (rightward in FIG. 13) than the first edge 31F of the negative active material layer 31. In other words, in the second separator 50 after shrinkage, a portion 51J close to the first edge 31S of the negative active material layer 31 is in a position displaced more outward in the axial direction DX (leftward in FIG. 13) than the curve positioned portion 51R of the third edge adjacent portion 51. Thus, this portion 51J is apt to be easily cracked (see FIG. 13).

However, the suppression portions CS3 are each designed to extend outward from the third edge adjacent portion 51 in the width direction DW and reach the first edge 56A of the second separator 50. In the battery 1, therefore, even when the second separator 50 thermally shrinks in the axial direction DX, the suppression portions CS3 are present near the second edge 31S of each negative active material layer 31.

The curve positioned portions 52R of the fourth edge adjacent portion 52 of the second separator 50 are displaced more inward in the axial direction DX (leftward in FIG. 13) than the second edge 31T of the negative active material layers 31. Thus, the portion 52J close to the second edge 31T of the negative active material layer 31 is apt to be easily cracked (see FIG. 13). However, the suppression portions CS4 are each designed to extend outward in from the fourth edge adjacent portion 52 the width direction DW and reach the second edge 56B of the second separator 50. The suppression portions CS4 are thus present near the second edges 31T of each negative active material layer 31.

Consequently, even when the first separator 40 formed with the suppression portions CS1 and CS2 thermally shrinks in the axial direction DX, it is possible to reliably prevent occurrence and growth of cracks in the portions 41J and 42J close to the edges 21S and 21T (the corners AN) of the positive active material layer 21. Even when the second separator 50 formed with the CS3 and CS4 thermally shrinks in the axial direction DX, as with the first separator 40, it is possible to reliably prevent occurrence and growth of cracks in the portions 51J and 52J close to the edges 31S and 31T (the corners AN) of the negative active material layer 31.

In the separators 40 and 50, the suppression portions CS1 to CS4 are arranged in a separated relationship at spaced intervals from each other in the winding circumferential direction DA. Even if a crack occurs in the first edge adjacent portion 41 provided with the suppression portions CS1, the second edge adjacent portion 42 provided with the suppression portions CS2, the third edge adjacent portion 51 provided with the suppression portions CS3, or the fourth edge adjacent portion 52 provided with the suppression portions CS4, it is possible to reduce growth of the crack within the size corresponding to the interval between the suppression portions CS1 (CS2 to CS4) at a maximum.

In a case where suppression portions are formed by heating a resin material KM, those portions are deformed due to thermal shrinkage. Accordingly, a separator formed with the suppression portions each having such a shape (e.g., a strip shape) as continuously extending in the winding circumferential direction DA (the longitudinal direction DC) is apt to remain warped or deformed. In contrast, the first separator 40 and the second separator 50, formed with the corresponding suppression portions CS1 to CS4 in a separated relationship in the winding circumferential direction DA, can more prevent warping or deforming caused in a forming process than a separator formed with suppression portions having a continuously extending shape in the winding circumferential direction DA. In the aforementioned battery 1 (the electrode body 10), therefore, the wound first separator 40 and second separator 50 are less likely to crinkle, for example. The battery 1 with higher reliability can be achieved.

In the first separator 40 and the second separator 50, all of the curve positioned portions 41R, 42R, 51R, and 52R and further the edge adjacent portions 41, 42, 51, and 52 including the corresponding curve positioned portions are respectively provided with the suppression portions CS1 to CS4. Accordingly, any of the first edge adjacent portion 41, the second edge adjacent portion 42, the third edge adjacent portion 51, and the fourth edge adjacent portion 52 can reliably prevent the occurrence and growth of cracks.

In the battery 1, furthermore, the first separator 40 and the second separator 50, the great number of suppression portions CS1 to CS4 are respectively formed over the entire area of the edge adjacent portions 41, 42, 51, and 52 in the winding circumferential direction DA. When the battery 1 is to be manufactured by using the first separator 40 formed with the suppression portions CS1 and CS2 and the second separator 50 formed with the CS3 and CS4, even when the separators 40 and 50 are wound without taking into consideration the positions of the suppression portions CS1 to CV4 in the winding circumferential direction DA, the battery 1 can be achieved reliably in which the suppression portions CS1 are positioned in the curve positioned portions 41R of the first edge adjacent portion 41, the suppression portions CS2 are positioned in the curve positioned portions 42R of the adjacent portion 42, the suppression portions CS3 are positioned in the curve positioned portions 51R of the third edge adjacent portion 51, and the suppression portions CS4 are positioned in the curve positioned portions 52R of the fourth edge adjacent portion 52.

The suppression portions CS1 to CS4 of the first separator 40 and the second separator 50 are designed as mentioned above to extend from the corresponding edges 46A, 46B, 56A, and 56B of the separators 40 and 50, inward in the axial direction DX (the short side direction DB) and obliquely toward the inner circumferential winding side DA1 (for example, the above angles $\theta 1$ to $\theta 4$ are set to $\theta 1$, $\theta 2$, $\theta 3$, and $\theta 4 = 75°$ in the present embodiment) (see FIG. 7). It was found that when the first separator 40 and the second separator 50 provided with the suppression portions CS1 to CS4 each extending in short linear form oblique to the inner circumferential winding side DA1 are wound together with the positive electrode sheet 20 and the negative electrode sheet 30, for example, the separators themselves are less likely to crinkle as compared with separators having suppression portions different only in angles $\theta 1$ to $\theta 4$ set to $\theta 1$, $\theta 2$, $\theta 3$, and $\theta 4 = 0°$ from the suppression portions CS1 to CS4 of the present embodiment. In the battery 1 in the present embodiment, therefore, the battery 1 can be achieved with the first separator 40 and the second separator 50 prevented from crinkling when wound and thus with higher reliability.

A method for manufacturing the battery 1 in the present embodiment will be explained referring to the accompanying drawings. The positive electrode sheet 20 of the electrode body 10 is first produced by a well-known method. To be concrete, the positive electrode sheet 20 is produced to include the strip-shaped positive electrode foil 28 extending in the longitudinal direction DC and two strip-shaped positive active material layers 21, 21 extending in the longitudinal direction DC of this positive electrode foil 28 (see FIG. 5).

Separately, the negative electrode sheet 30 is also produced by a well-known method. To be concrete, the negative electrode sheet 30 is produced to include the strip-shaped negative electrode foil 38 extending in the longitudinal direction DC and two strip-shaped negative active material layers 31, 31, extending in the longitudinal direction DC of this negative electrode foil 38 (see FIG. 5).

Figure 14:
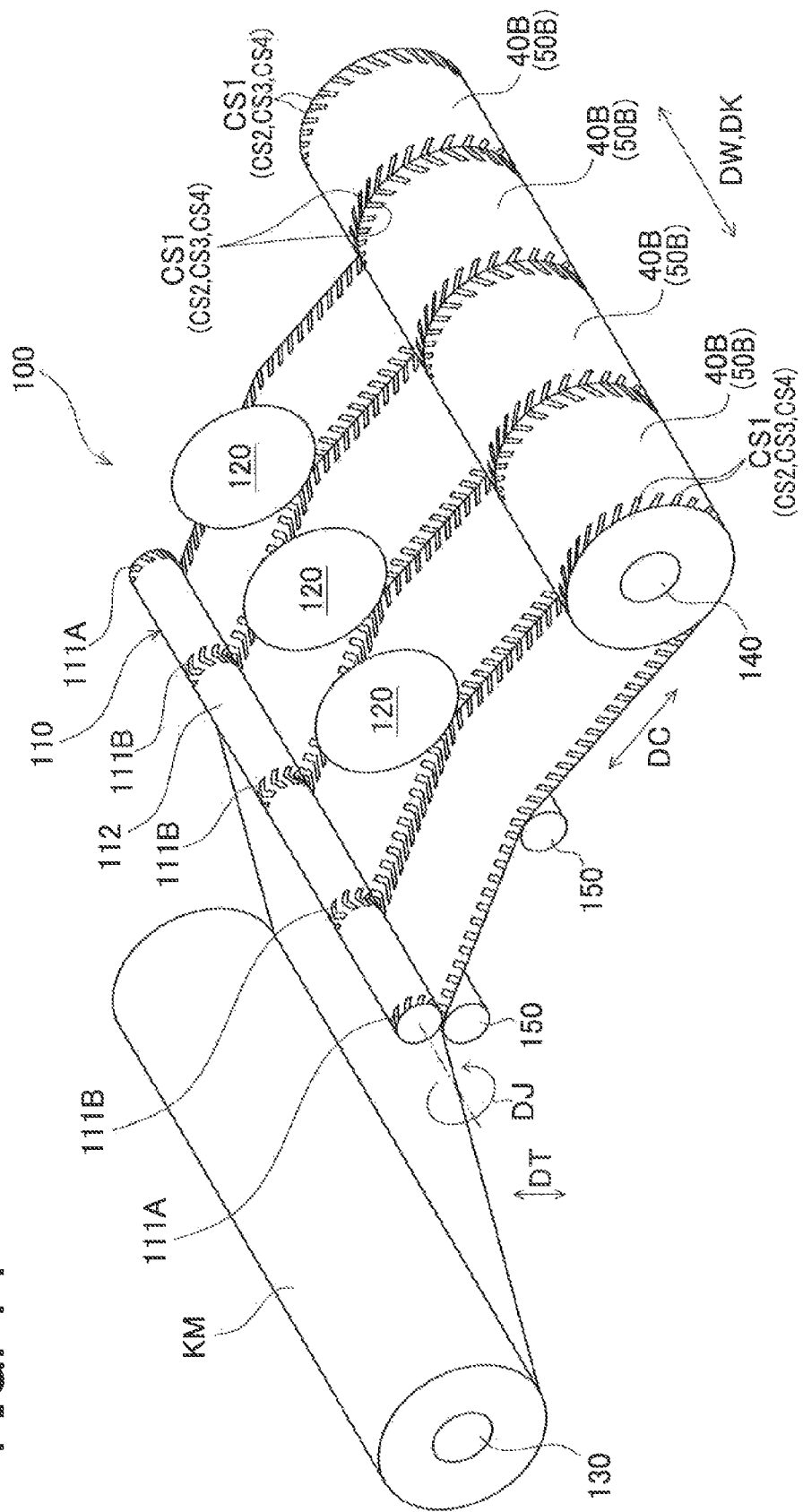
FIG. 14 is an explanatory view of a method and an apparatus for producing a first separator and a second separator in a battery manufacturing method in the embodiment.

A next explanation is given to producing the separators 40 and 50 including the aforementioned suppression portions CS1 to CS4. FIG. 14 shows a method and an apparatus 100 to form the suppression portions CS1 to CS4 which are the press-heated portions in the resin material KM forming the separator 40 or 50. This apparatus 100 includes a winding-off part 130 to wind off a strip-shaped unprocessed resin material KM in the longitudinal direction DC, a plurality of auxiliary rolls 150, 150, a suppression-portion forming roll 110 arranged to pinch the resin material KM in cooperation with the auxiliary rolls 150 and form the suppression portions CS1 to CS4 in the resin material KM, cutting parts 120 to cut the resin material KM in the longitudinal direction DC, and a winding-up part 140 to wind up the processed resin material KM (subjected to pressing-heating treatment and cutting) (an uncut first separator 40B, mentioned later (an uncut second separator 50B)).

The suppression-portion forming roll 110 includes a body part 112 made of metal in a cylindrical shape, first raised portions 111A being located at both ends of the main body 112 in the axial direction DK and each protruding in a short linear shape radially outward from the cylindrical surface of the main body 112 and second raised portions 111B being located in a middle area in the axial direction DK and protruding in a V shape radially outward from the cylindrical surface of the body part 112 (see FIG. 14). The first raised portions 111A and the second raised portions 111B are arranged respectively in multiple number at equal intervals in the rotation direction DJ of the body part 112. As shown in FIG. 14, each of the first raised portions 111A extends so that both ends in the axial direction DK are oriented in the rotation direction DJ with respect to the axial direction DK and each of the second raised portions 111B is arranged in an inverted V shape in the rotation direction DJ. The suppression-portion forming roll 110 is heated by a heater not shown. Thus, the heated first raised portions 111A and second raised portions 111B are pressed against the resin material KM.

The cutting parts 120 including a plurality of disc cutters are arranged to cut the resin material KM in the longitudinal direction DC so that the size of the resin material KM in the short side direction DB is equal to the size of each of the aforementioned separator 40 and the second separator 50 in the short side direction DB. To be concrete, each cutting part 120 cuts the resin material KM by passing the center of each V-shaped suppression portion formed by the second raised portions 111B of the suppression-portion forming roll 110.

Firstly, the strip-shaped resin material KM is wound off from the winding-off part 130 and allowed to pass between the suppression-portion forming roll 110 and the auxiliary roll 150 (see FIG. 14). At that time, the resin material KM is pinched or caught between the heated first raised portions 111A and second raised portions 111B and the cylindrical surface of the auxiliary roll 150 and thus the resin material KM is heated as being pressed in the thickness direction DT by the first raised portions 111A and the second raised portions 111B. Accordingly, the resin material KM is formed with a great number of suppression portions arranged along the longitudinal direction DC. Thereafter, the resin material KM is cut in the longitudinal direction DC with the aforementioned cutting parts 120. After cutting, the uncut first separator 40B having a longer length in the longitudinal direction DC than the first separator 40 (or the uncut second separator 50B having a longer length in the longitudinal direction DC than the second separator 50) is wound up by the winding-up part 140. The uncut first separator 40B (the uncut second separator 50B) wound up by the winding-up part 140 is cut off in the longitudinal direction DC to produce the aforementioned first separator 40 (the second separator 50) (see FIG. 7).

The thus produced first separator 40 includes the suppression portions CS1 and CS2 which are the press-heated portions formed by pressing the resin material KM in the thickness direction DT by the suppression-portion forming roll 110 so that the second thickness T2 of the suppression portions is thinner than the first thickness T1 of the surrounding resin material KM (T2<T1) and the orientation of polymer constituting the resin material KM in the longitudinal direction DC is lowered (see FIG. 7). The second separator 50 includes the suppression portions CS3 and CS4 which are the press-heated portions formed by pressing the resin material KM so that the thickness T2 (the second thickness) of the suppression portions is thinner than the first thickness T1 of the surrounding resin material KM (T2<T1) and the orientation of polymer constituting the resin material KM in the longitudinal direction DC is lowered (see FIG. 7).

Figure 15:
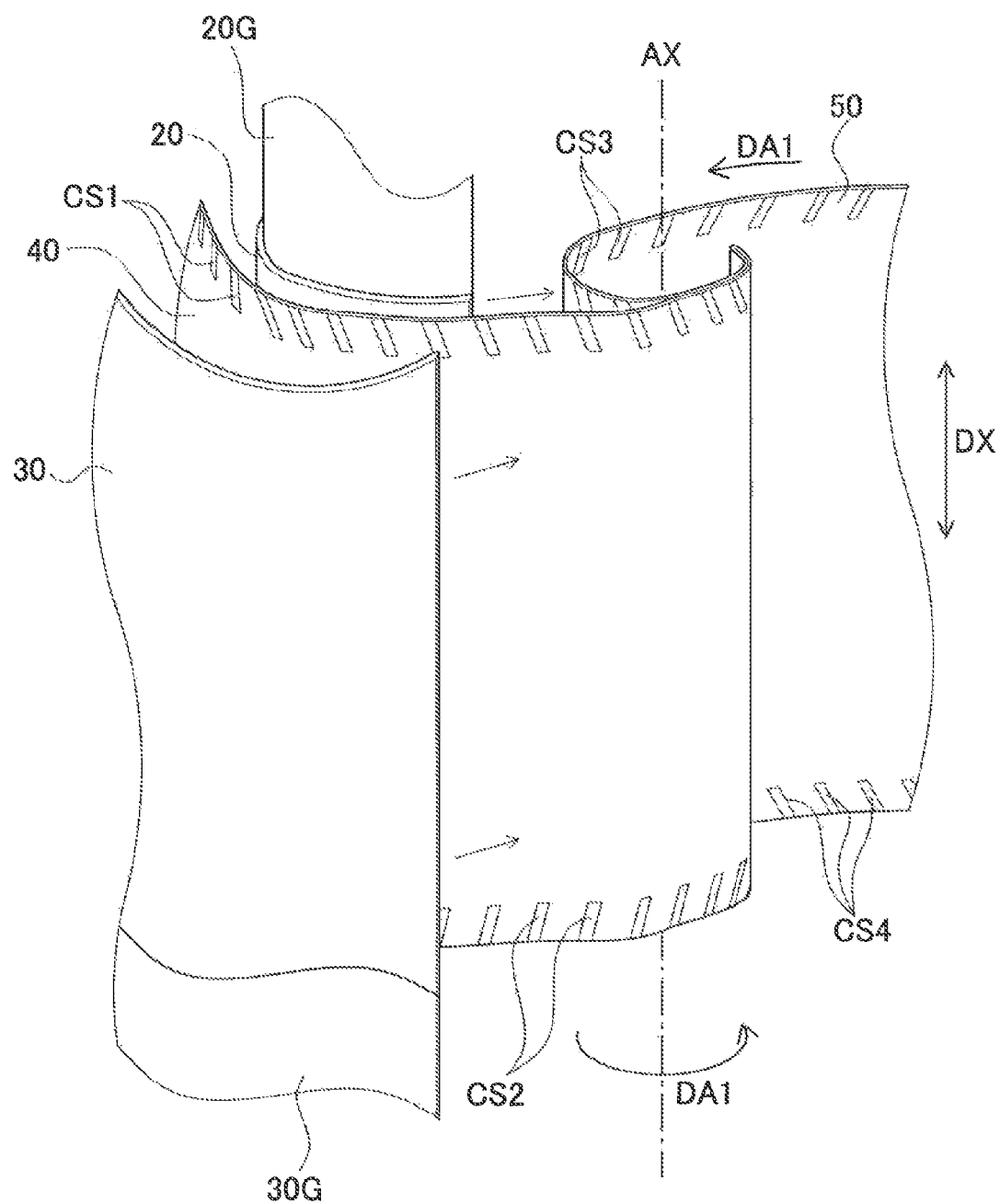
FIG. 15 is an explanatory view to explain a winding step of the battery manufacturing method in the embodiment.

Next, a winding step will be explained. The positive electrode sheet 20 and the negative electrode sheet 30 each produced as above are wound together with the first separator 40 including the suppression portions CS1 and CS2 and the second separator 50 including the suppression portions CS3 and CS4, which are produced as above, into a cylindrical shape. At that time, the first separator 40, the negative electrode sheet 30, the second separator 50, and the positive electrode sheet 20 are wound in this order. Accordingly, the positive electrode sheet 20 is placed on the inside of the first separator 40, the second separator 50 is placed on the inside of the positive electrode sheet 20, and the negative electrode sheet 30 is placed on the inside of the second separator 50 (see FIG. 15). Furthermore, the first separator 40 and the second separator 50 are wound from the aforementioned inner circumferential winding sides DA1 in the winding circumferential direction DA. The positive electrode sheet 20 and the negative electrode sheet 30 are placed so that the positive exposed portion 20G and the negative exposed portion 30G are positioned on opposite sides from each other in the axial direction DX. After winding, the cylindrical surface is squeezed from both sides, thus producing a flat wound electrode body 10 having a flat oval cross section.

Subsequently, the positive terminal member 60 is welded to the positive electrode sheet 20 and the negative terminal member 70 is welded to the negative electrode sheet 30, respectively. The electrode body 10 is put in the case body 81, the electrolyte is poured, and then the case body 81 is sealingly closed with the closing lid 82. Thus, the battery 1 is completed (see FIGS. 1 and 2).

The method for manufacturing the battery 1 in the present embodiment includes a winding step of winding the first separator 40 provided in advance with the suppression portions CS1 in the portions of the first edge adjacent portion 41 (the portions defining the curve positioned portions) to be placed in the curved winding portions 11 and the suppression portions CS2 in the portions of the second edge adjacent portion 42 to be placed in the curved winding portions 11 and the second separator 50 provided in advance with the suppression portions CS3 in the portions of the third edge adjacent portion 51 to be placed in the curved winding portions 11 and the suppression portions CS4 of the fourth edge adjacent portion 52 to be placed in the curved winding portions 11. This method therefore can easily produce the battery 1 configured such that, even when the internal temperature of the battery 1 rises in use, causing the first separator 40 and the second separator 50 to thermally shrink in the winding circumferential direction DA, this battery 1 can prevent occurrence and growth of cracks in the edge adjacent portions 41, 42, 51, and 52 provided with the corresponding suppression portions CS1 to CS4, and thereby prevent the occurrence of a short circuit between the positive electrode sheet 20 and the negative electrode sheet 30 through the cracks.

Further, in the winding step, there is used the first separator 40 formed with the great number of suppression portions CS1 and CS2 respectively in the edge adjacent portions 41 and 42 of the first separator 40 throughout the longitudinal direction DC (the winding circumferential direction DA). There is used the second separator 50 formed with the great number of suppression portions CS3 and CS4 respectively in the edge adjacent portions 51 and 52 of the second separator 50 throughout the longitudinal direction DC (the winding circumferential direction DA). In the winding step, therefore, there is no need to take into consideration the positions of those suppression portions CS1, CS2, and suppression portions CS3, CS4 in the longitudinal direction DC (the winding circumferential direction DA). This enables easily winding the first separator 40 and the second separator 50. Furthermore, the battery 1 can be manufactured with the suppression portions CS1 to CS4 reliably provided in respective corresponding curve positioned portions 41R of the first edge adjacent portion 41, curve positioned portions 42R of the second edge adjacent portion 42, curve positioned portions 51R of the third edge adjacent portion 51, and curve positioned portions 52R of the fourth edge adjacent portion 52.

Although the present invention is explained in the above embodiment, the invention is not limited to the above embodiment and may be embodied in other specific forms without departing from the essential characteristics thereof.

Figure 16:
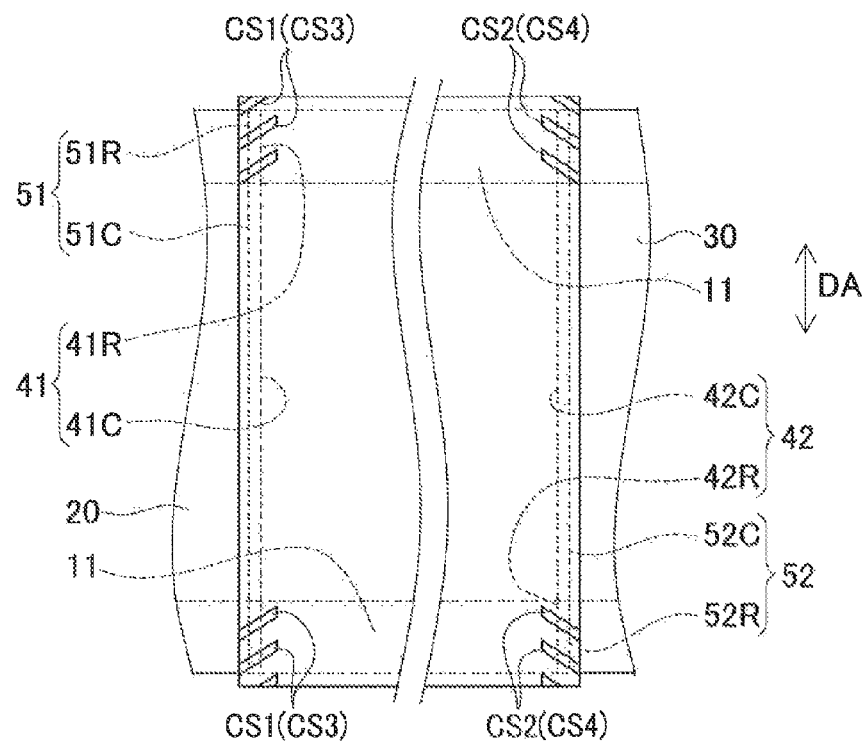
FIG. 16 is an explanatory view showing another configuration of the electrode body.

For instance, the embodiment shows the configuration that the suppression portions CS1 are formed in the first edge adjacent portion 41 of the first separator 40, the suppression portions CS2 are formed in the second edge adjacent portion 42, the suppression portions CS3 are formed in the third edge adjacent portion 51 of the second separator 50, and the suppression portions CS4 are formed in the fourth edge adjacent portion 52 (see FIGS. 2 and 3). However, for example, an alternative may be configured such that the suppression portions CS1 are provided only in the curve positioned portions 41R of the first edge adjacent portion 41, the suppression portions CS2 are provided only in the curve positioned portions 42R of the second edge adjacent portion 42, the suppression portions CS3 are provided only in the curve positioned portions 51R of the third edge adjacent portion 51, and the suppression portions CS4 are provided only in the curve positioned portions 52R of the fourth edge adjacent portion 52 (see FIG. 16).

Figure 17:
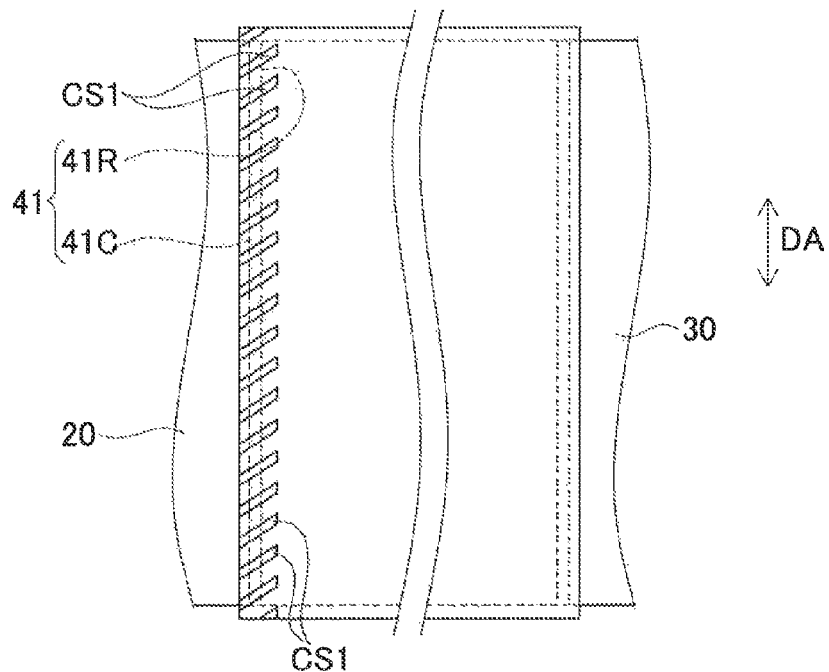
FIG. 17 is an explanatory view showing another configuration of the electrode body.

The embodiment further shows the configuration that the suppression portions CS1 to CS4 are provided in the corresponding edge adjacent portions of the first separator 40 and the second separator 50 (the first edge adjacent portion 41, second edge adjacent portion 42, third edge adjacent portion 51, and fourth edge adjacent portion 52) (see FIGS. 2 and 3). However, as alternatives, there may be configured that the suppression portions are provided in any one of the edge adjacent portions, e.g., the suppression portions CS1 are provided only in the first edge adjacent portion 41 as shown in FIG. 17, or that the suppression portions are provided in two or three of the edge adjacent portions.

Figure 18:
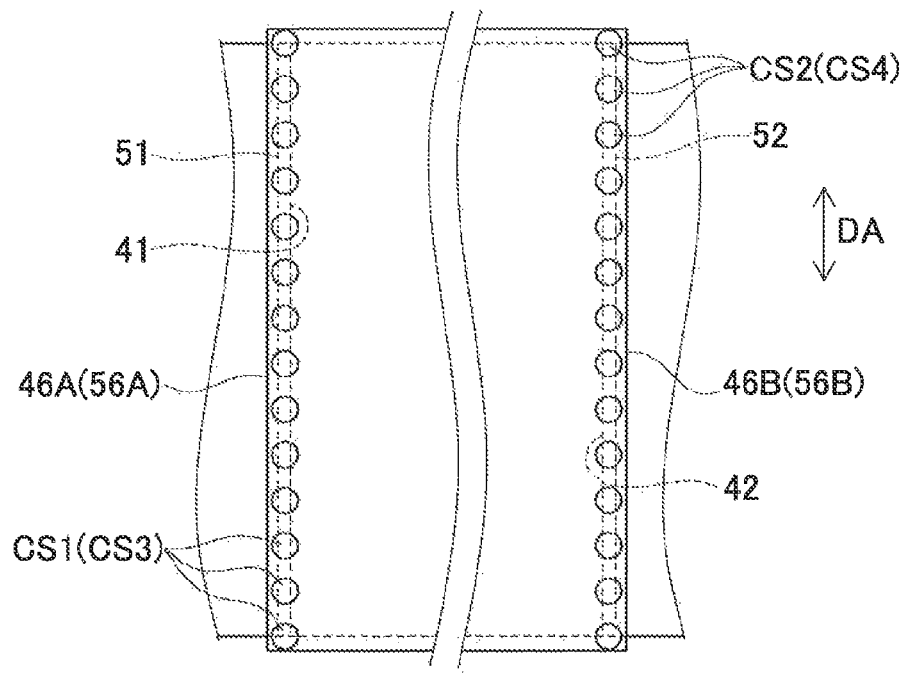
FIG. 18 is an explanatory view showing another configuration of the electrode body.
Figure 19:
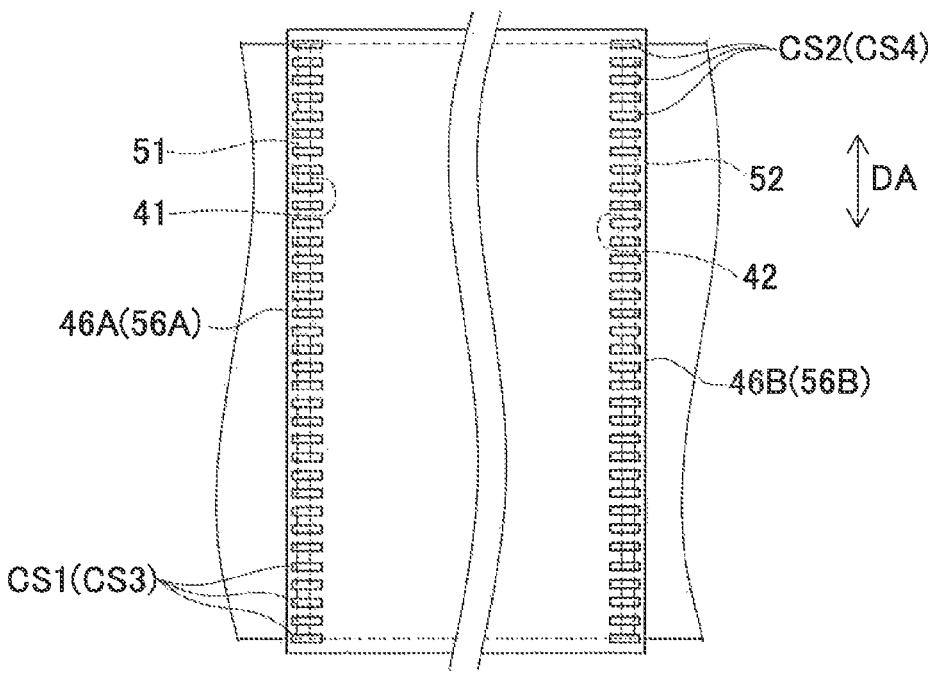
FIG. 19 is an explanatory view showing another configuration of the electrode body.

In the embodiment, there are provided the great number of suppression portions CS1 to CS4 each shaped in a short linear form (see FIGS. 2 and 3). However, for example, the suppression portions CS1 to CS4 may also be circular (see FIG. 18) or polygonal (e.g., rectangular (see FIG. 19)). As shown in FIGS. 18 and 19, furthermore, the suppression portions CS1 to CS4 may be configured to be away from the corresponding edges 46A, 46B, 56A, and 56B.

Figure 20:
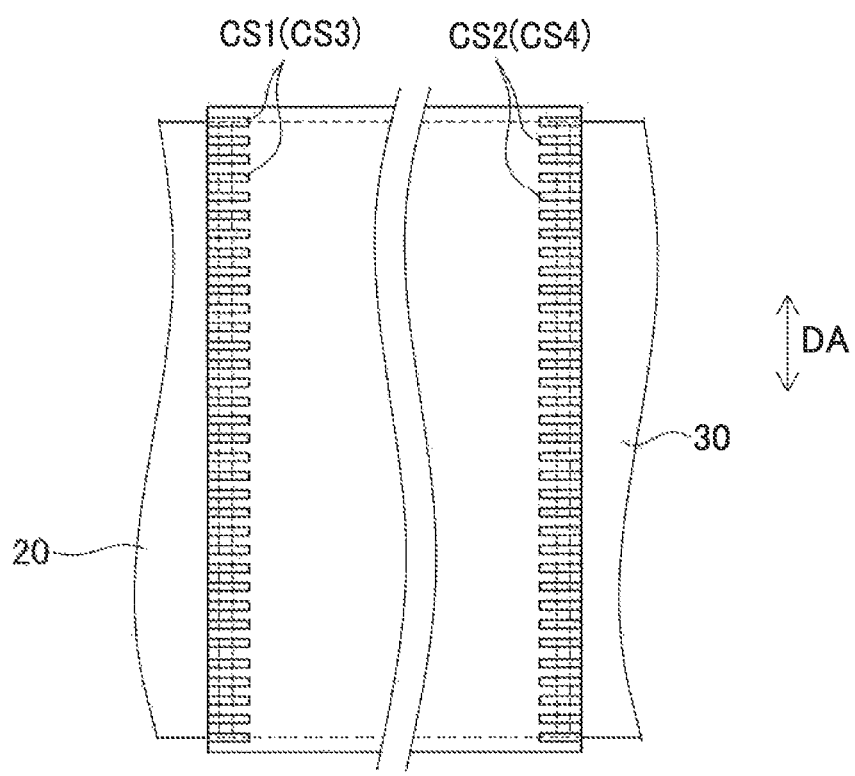
FIG. 20 is an explanatory view showing another configuration of the electrode body.
Figure 21:
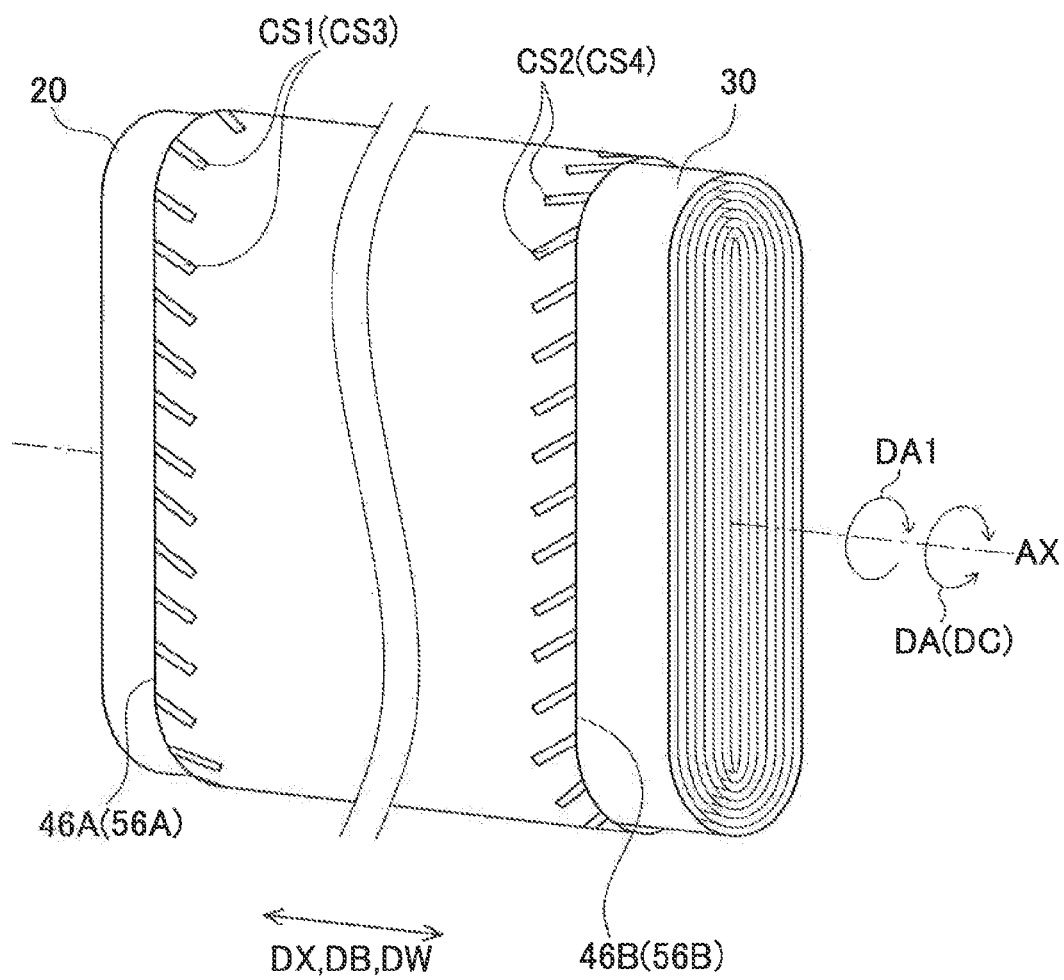
FIG. 21 is an explanatory view showing another configuration of the electrode body.
Figure 22:
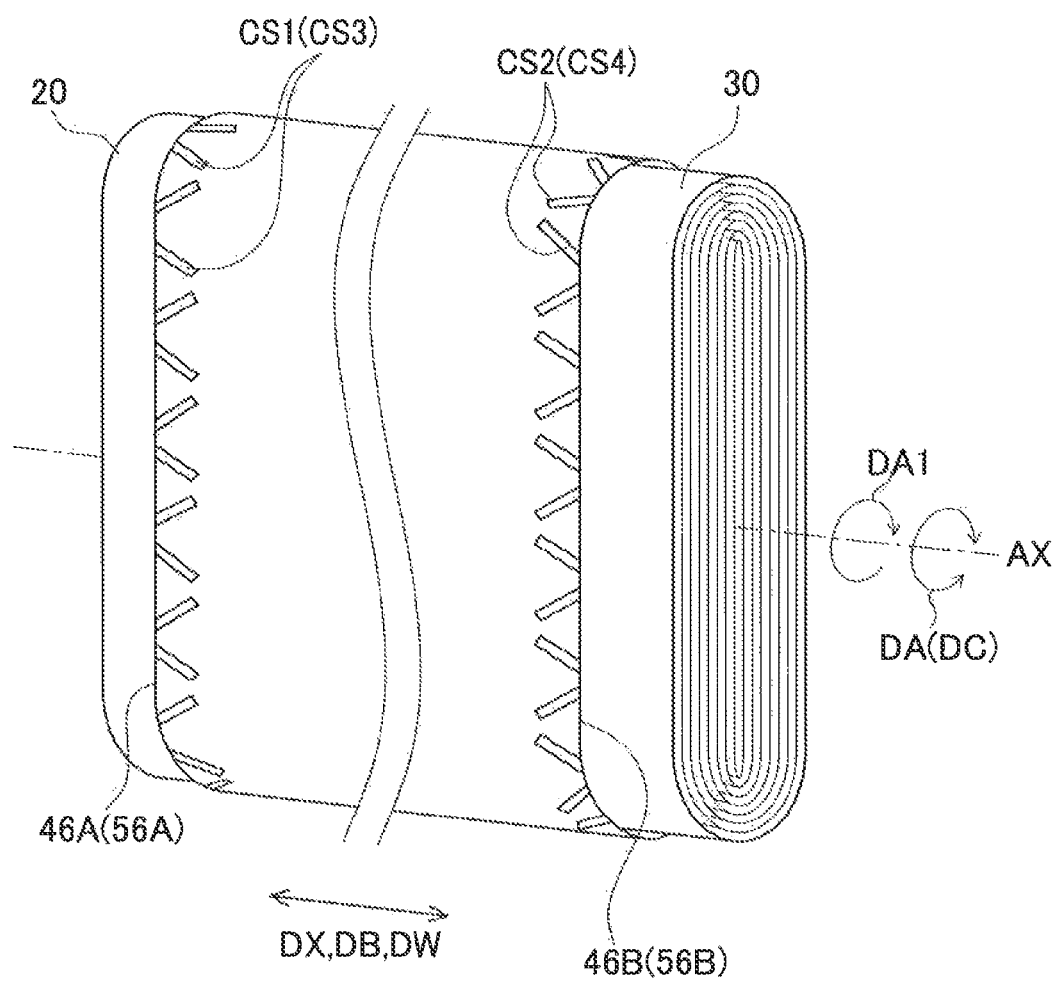
FIG. 22 is an explanatory view showing another configuration of the electrode body.

The present embodiment shows the configuration that the suppression portions CS1 to CS4 formed at the aforementioned angles θ1 to θ4 each set to 75° (θ1, θ2, θ3, θ4)=75° are provided in the first separator 40 and the second separator 50. As an alternative, for example, the suppression portions CS1 to CS4 each having a short liner form may be provided at the angles θ1 to θ4 set to θ1, θ2, θ3, θ4=0° (see FIG. 20). The suppression portions CS1 to CS4 (at negative angles θ1 to θ4) may also be provided to extend obliquely inward from the edges of the separators in the axial direction DX and toward an opposite side to the inner circumferential winding side DA1 of the winding circumferential direction DA of the separators (see FIG. 21). Moreover, the suppression portions CS1 to CS4 may be provided to include suppression portions extending toward the inner winding side DA1 and suppression portions extending toward the opposite side to the inner circumferential winding side DA1, these suppression portions being alternately arranged in the winding circumferential direction DA (see FIG. 22).

Figure 23:
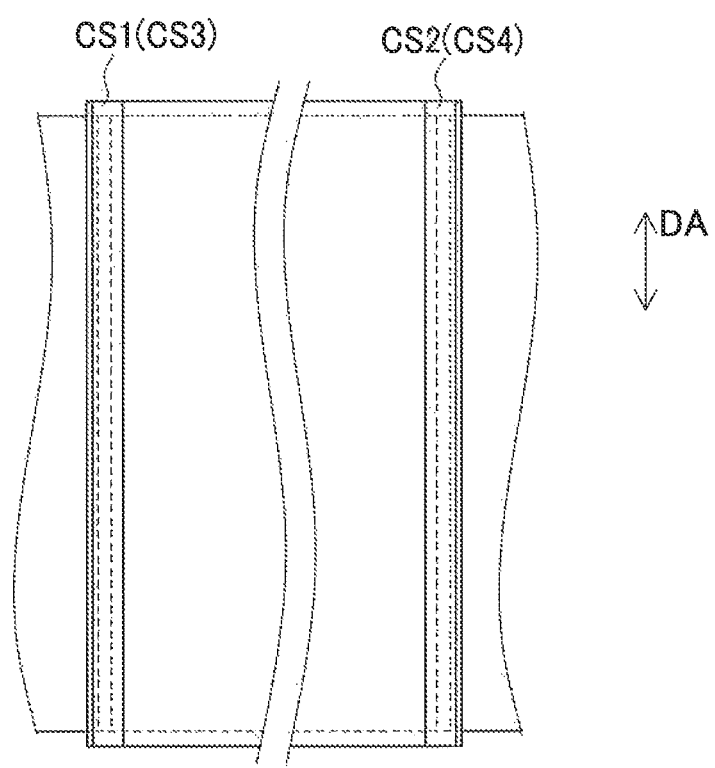
FIG. 23 is an explanatory view showing another configuration of the electrode body.

The embodiment shows that the suppression portions CS1 to CS4 are formed in a separated relationship throughout the winding circumferential direction DA of the first separator 40 and the second separator 50 (see FIGS. 2 and 3). However, for example, the suppression portions may be provided to continuously extend in the corresponding adjacent portions 41, 42, 51, and 52 throughout the winding circumferential direction DA of the separators 40 and 50 (see FIG. 23).

The embodiment shows the battery including the first separator and the second separator that are separate members. As an alternate, an electrode body may use an integral first separator and second separator (that is, for example, an electrode body using a first separator and a second separator made by folding a single resin material at a location near the winding axis). The suppression portions shown herein are portions of the resin material heated under pressure in the thickness direction to have a decreased orientation of polymer in the winding circumferential direction. As an alternative, however, the suppression portions may be portions of the resin material heated to have a decreased orientation of polymer constituting the resin material in the winding circumferential direction or portions of the resin material attached with a resin tape for reinforcement.

The invention claimed is:

1. A battery provided with a flat wound electrode body including a positive electrode sheet having a positive active material layer and a negative electrode sheet having a negative active material layer, the positive electrode sheet and the negative electrode sheet being wound together with a separator in a flat shape,
    wherein the separator includes an edge adjacent portion close to any one of an edge of the positive active material layer in an axial direction along a winding axis of the flat wound electrode body and an edge of the negative active material layer in the axial direction, and
    the edge adjacent portion includes a curve positioned portion placed in a curved portion of the flat wound electrode body,
    the separator includes a plurality of suppression portions configured to suppress occurrence of a crack or growth of a crack, the suppression portions being placed only in an edge portion extending along an edge of the separator in the axial direction and including the edge adjacent portion and in at least the curve positioned portion of the edge adjacent portion, and arranged in a separated relationship at spaced intervals from each other in a winding circumferential direction of the flat wound electrode body.

2. The battery according to claim 1, wherein the separator made of a porous resin material with a polymer oriented in a predetermined direction, and
    the suppression portion is made so that an orientation state of the polymer in the suppression portion is different from an orientation state of the polymer in other portions.

3. The battery according to claim 2, wherein
    the separator has an orientation that the polymer is oriented in the predetermined direction, and
    the suppression portion has an orientation of the polymer that is lower than an orientation of the polymer in the other portions.

4. The battery according to claim 3, wherein the predetermined direction is a winding circumferential direction of the flat winding electrode body.

5. The battery according to claim 4, wherein the suppression portion is a press-heated portion made of the resin material forming the separator pressed by a heated member in a thickness direction so that the press-heated portion has a thickness thinner than a thickness of a portion surrounding the press-heated portion.

6. The battery according to claim 1, wherein the suppression portion is configured to extend outward from the edge adjacent portion of the separator in a width direction of the separator and reach an edge of the separator.

7. The battery according to claim 1,
wherein the separator includes:
   a first separator located on a radial outside of the positive electrode sheet in the flat wound electrode body; and
   a second separator located on the radial outside of the negative electrode sheet in the flat wound electrode body,
wherein the flat wound electrode body is configured such that
the positive electrode sheet, the first separator, the negative electrode sheet, and the second separator are wound,
in each of the first separator and the second separator, the edge adjacent portion located at each side in an axial direction along a winding axis of the flat wound electrode body includes the suppression portion in at least the curve positioned portion.

8. The battery according to claim 1, wherein the separator is formed with the suppression portion in the edge adjacent portion throughout the winding circumferential direction.

9. The battery according to claim 2, wherein the suppression portion is configured to extend outward from the edge adjacent portion of the separator in a width direction of the separator and reach an edge of the separator.

10. The battery according to claim 3, wherein the suppression portion is configured to extend outward from the edge adjacent portion of the separator in a width direction of the separator and reach an edge of the separator.

11. The battery according to claim 4, wherein the suppression portion is configured to extend outward from the edge adjacent portion of the separator in a width direction of the separator and reach an edge of the separator.

12. The battery according to claim 5, wherein the suppression portion is configured to extend outward from the edge adjacent portion of the separator in a width direction of the separator and reach an edge of the separator.

* * * * *